United States Patent
Cho et al.

(10) Patent No.: US 6,520,777 B2
(45) Date of Patent: Feb. 18, 2003

(54) MICRO-MACHINED SILICON ON-OFF FIBER OPTIC SWITCHING SYSTEM

(75) Inventors: Dong-il Cho, Seoul (KR); Tallis Chang, Altadena, CA (US)

(73) Assignee: Chromux Technologies, Inc., Oxnard, CA (US)

( * ) Notice: Subject to any disclaimer, the term of this patent is extended or adjusted under 35 U.S.C. 154(b) by 135 days.

(21) Appl. No.: 09/771,169

(22) Filed: Jan. 26, 2001

(65) Prior Publication Data

US 2002/0102059 A1 Aug. 1, 2002

(51) Int. Cl.⁷ .............................. G02B 6/30; G02B 6/26; G02B 6/42
(52) U.S. Cl. ........................................... 439/49; 439/52
(58) Field of Search .............................. 385/49, 19, 16, 385/23, 31, 52, 15

(56) References Cited

U.S. PATENT DOCUMENTS

| | | | | |
|---|---|---|---|---|
| 4,265,514 A | * | 5/1981 | Wellington et al. | 385/65 |
| 4,302,729 A | * | 11/1981 | Burnham et al. | 372/48 |
| 4,890,895 A | * | 1/1990 | Zavracky et al. | 385/130 |
| 5,359,687 A | * | 10/1994 | McFarland et al. | 385/49 |
| 5,640,477 A | * | 6/1997 | Anderson | 385/88 |
| 5,930,595 A | | 7/1999 | Sridhar et al. | 438/52 |
| 6,150,275 A | | 11/2000 | Cho et al. | 438/696 |
| 2002/0051618 A1 | * | 5/2002 | Ten Eyck | 385/137 |
| 2002/0072111 A1 | * | 6/2002 | Clarkin et al. | 435/287.1 |

OTHER PUBLICATIONS

James A. Walker, "Topical Review—The Future of MEMS in Telecommunications Networks," J. Micromech. Microeng. 10 (2000), pp. R1–R7.

Cornel Marxer, et al., "Vertical Mirrors Fabricated by Deep Reactive Ion Etching for Fiber–Optic Switching Applications," Journal of Microelectromechanical Systems, vol. 6, No. 3, Sep. 1997, pp. 277–285.

Sangwoo Lee, et al., "A New Micromachining Technique with (111) Silicon," Jpn. J. Appl. Phys. vol. 38, Part 1, No. 5A, May 1999, pp. 2699–2703.

Sangwoo Lee, et al., "The Surface/Bulk Micromachining (SBM) Process: A New Method for Fabricating Released MEMS in Single Crystal Silicon," Journal of Microelectromechanical Systems, vol. 8, No. 4, Dec. 1999, pp. 409–416.

Sangwoo Lee, et al., "Surface/Bulk Micromachined Single–Crystalline–Silicon Micro–Gyroscope," In press to appear JMEMS, Dec. 2000, pp. 1–50.

* cited by examiner

*Primary Examiner*—Lynn D. Feild
*Assistant Examiner*—Chandrika Prasad
(74) *Attorney, Agent, or Firm*—Hogan & Hartson L.L.P.

(57) ABSTRACT

An optical ON/OFF switch includes a micro-mechanical shutter formed on a silicon substrate using micro-mechanical fabrication techniques. The switch selectively opens and closes an optical path between two fibers with the micro-mechanical shutter. A micro-mechanical latch latches the shutter open or closed and remains in this state until electrical signals disengage the latch. Incoming and outgoing fibers are coupled to the shutter within the switch so that, when the shutter and the switch are ON (open) light couples between the ends of the two fibers. The fibers are positioned within stepped channels that hold each fiber along two edges within the channels so that the fibers are held in fixed alignment and relation. The fibers are laterally offset with respect to each other and the faces of the fibers are angled to limit back reflections from the shutter while still obtaining good coupling between the fibers.

32 Claims, 18 Drawing Sheets

CONFORMAL OXIDE DEP

POLYSILICON DEP AND DOPING

METAL (Al) DEP.

POLYSILICON ETCH FOR ISOLATION

MICRO-MACHINED SILICON ON-OFF FIBER OPTIC SWITCHING SYSTEM

BACKGROUND OF THE INVENTION

1. Field of the Invention

The present invention relates to integrated optical components and, in particular, to optical components that are readily coupled to optical fibers and to optical components capable of switching an optical path on and off.

2. Description of the Related Art

Optical networks have become prevalent in long distance communication networks, including for the backbone of the Internet. Demand for additional bandwidth in all manner of optical networks continues to grow and a variety of different strategies have been adopted to improve the utilization of the bandwidth within existing optical fiber networks. There is, for example, increasing utilization of multiple wavelength or broad-spectrum light communication over optical fiber links, generally using the technology known as wavelength division multiplexing ("WDM"). Presently the most common implementation of WDM communication uses a plurality of different lasers as light sources, with each laser emitting light at a wavelength different from the wavelengths emitted by the other lasers in the system. Each of the different wavelengths of light represents a different, substantially independent communication channel and symbols can be transmitted on each of these different communication channels using a modulation and encoding stream appropriate to the channel. For example, each of the channels might be modulated and encoded using time domain techniques.

Optical networks require a variety of switches to be operable, including add drop switches and multiplexers. The lack of adequate, reliable and cost-effective switches has retarded the implementation of optical networks and has limited switched optical networks to very high traffic systems.

Micro-mechanical systems include devices such as gyroscopes and mirror arrays formed on the surface of semiconductor substrates. In essence, these are very small mechanical devices formed on the surface of semiconductor substrates using semiconductor fabrication technology, including photolithography, thin film deposition, etching, and impurity doping by diffusion and ion-implantation. Micro-mechanical systems often include moving parts that are released from the underlying substrate and can move independently of the substrate.

Aspects of the present invention take advantage of micromechanical manufacturing technology to provide optical components.

SUMMARY OF THE PREFERRED EMBODIMENTS

One aspect of the invention provides an optical system that includes an optical component formed on a substrate and an alignment channel formed on the substrate. The alignment channel is adapted to accept an optical fiber and couple the optical fiber to the optical component. The alignment channel includes first and second edges extending along a length of an optical fiber positioned within the alignment channel and positioned within the alignment channel so that an optical fiber positioned within the alignment channel is supported and positioned by the first and second edges.

Another aspect of the present invention provides an optical system having a substrate with an optical path defined therein. The substrate includes a shutter translatable with respect to the optical path, the shutter within the optical path in at least one position and the shutter not in the optical path in at least one position, the shutter translatable in response to electrical signals. The substrate further includes first and second alignment channels, with the first alignment channel holding a first optical fiber and positioning a first core of the first optical fiber with respect to the second alignment channel. The second alignment channel holds a second optical fiber and positions a second core of the second optical fiber with respect to the first alignment channel. The optical path passes through the first and second alignment channels and a portion of the optical path extends outside of the first and second alignment channels with the shutter selectively positioned within the portion of the optical path outside of the first and second alignment channels. The first and second alignment channels are offset with respect to one another so that the first core and the second core are misaligned when the first and second fibers are positioned within the alignment channels.

Still another aspect of the present invention provides an optical system having an optical path defined in part by first and second optical fibers, a portion of the optical path extending outside of the first and second optical fibers. A substrate at least partially includes the optical path. The substrate further includes a shutter selectively translatable with respect to the optical path so that the shutter is within the optical path in at least one position and the shutter is not in the optical path in at least one position. The shutter is selectively translatable in response to electrical signals within the portion of the optical path outside of the first and second optical fibers. A latch is formed in the substrate and is adapted to couple to a portion of the shutter and hold the shutter out of the portion of the optical path outside of the first and second optical fibers.

Yet another aspect of the present invention provides an optical system, comprising a substrate having an optical path defined therein. The substrate further includes a shutter translatable with respect to the optical path, the shutter within the optical path in a first position and the shutter not in the optical path in at least a second position. The shutter is translatable in response to electrical signals and the shutter has a reflecting surface positioned within the optical path when the shutter is in the first position. The substrate further includes first and second alignment channels, with the first alignment channel holding a first optical fiber and positioning a first core of the first optical fiber with respect to the second alignment channel. The second alignment channel holds a second optical fiber and positions a second core of the second optical fiber with respect to the first alignment channel. The optical path passes through the first and second fibers and a portion of the optical path extends outside of the first and second fibers with the shutter selectively positioned within the portion of the optical path outside of the first and second fibers. Faces of the first and second fibers each have an angle with respect to the optical path sufficient to prevent back reflections from the shutter when the shutter is in the first position.

BRIEF DESCRIPTION OF THE DRAWINGS

Aspects and various advantages of the present invention are described below, with reference to the various views of the drawings, which form a part of this disclosure.

DETAILED DESCRIPTION OF THE PREFERRED EMBODIMENTS

Figure 1:
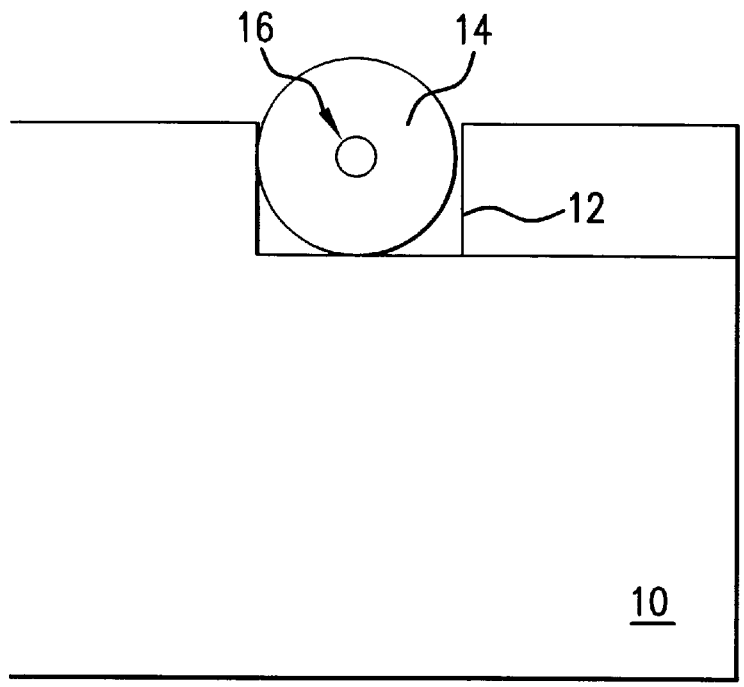
FIG. 1 shows an alignment channel on a surface of a substrate with a fiber within the alignment channel.

Particularly preferred embodiments of the present invention provide a mechanism for readily aligning an optical fiber with respect to another optical fiber or with respect to one or more optical components. Conventional integrated optical components may provide rectangular channels for holding optical fibers in place with respect to other fibers or with respect to inputs or outputs of optical components. To provide accurate alignment, such rectangular channels need to be fit precisely to the outer diameter of the fiber. This is difficult to do, as fibers have varying outer diameters and process variations can produce different size channels.

Particularly preferred embodiments of the present invention provide an improved alignment structure that may include a first channel with a second channel formed extending below the bottom of the first channel. This structure provides two parallel edges on which a fiber rests when installed in the channel. By positioning the fiber on two edges extending along the path of the fiber, dimensional variations in fibers with respect to the dimensions of an alignment channel are largely accommodated, especially when a single fiber is cut and the two ends of the cut fiber are coupled into an optical component.

Aspects of the present invention are described with reference to an optical ON/OFF switch that selectively opens and closes an optical path between two optical fibers. Two fibers are accurately aligned with respect to each other, with the ends of the fibers spaced apart to allow for a micro-mechanical shutter to be positioned between the ends of the two fibers. Most preferably, the fibers are offset laterally from one another so the cores of the fibers do not precisely align to limit undesirable reflections. The optical switch selectively opens and closes the optical path between two fibers with the micro-mechanical shutter in response to electrical signals. The shutter preferably can be latched open or closed by a micro-mechanical latch, so that the ON or OFF state of the switch is maintained without applying a continuous electrical signal to the switch. The shutter remains in this open state until electrical signals are applied to disengage the latch.

Incoming and outgoing fibers are coupled to the shutter within the switch so that, when the shutter and the switch are ON (open) light couples between the ends of the two fibers. The fibers are positioned within stepped alignment channels. The alignment channels preferably include an upper recess extending from the surface of the substrate and a lower recess extending from the bottom of the first recess so that two edges are formed at the intersections between the recesses on opposite sides of the channel. The alignment channels preferably hold each fiber along two edges within the channels so that the fibers are held in fixed alignment and relation. The switch is formed on a silicon substrate using micro-mechanical fabrication techniques.

The various aspects of this optical system and manufacturing method are now described with reference to the various drawings. First the alignment channels are described, as they are a basic building block that is used to advantage in the optical system described below.

One of the problems faced in implementing optical systems and optical switches is assembling the optical components to the incoming and outgoing optical fibers. The conventional assembly process known as pigtailing essentially manually aligns the fiber with the optical component and affixes the fiber to the optical component. Proper assembly of the fiber to the optical component requires that the core of the fiber be positioned appropriately to the input or output of the optical component. This is a time consuming, often inaccurate process that accounts for a large proportion of the cost of optical systems assembled using pigtailing.

Another strategy is to provide an alignment channel that assists in aligning the fiber to a fixed position with respect to the input or output of the optical component. A typical fiber might have a diameter of 125 $\mu$m and so an alignment channel might be provided having a width of 125 $\mu$m and a depth greater than half the diameter of the fiber, for example at least around 70 to 80 $\mu$m. The solution of providing a rectangular channel as an alignment aid is not entirely satisfactory, however, since optical fibers inevitably have variations in diameter. Typical variations in the 125 $\mu$m nominal diameter of a fiber might be on the order of ±1 $\mu$m. It is not practical to adjust the width of the channel to accommodate the variations in the fiber diameter so, as a practical matter, the channel might be made to accommodate the largest expected fiber of approximately 126 $\mu$m.

Variations in the fiber diameter can therefore lead to misalignments between the fiber and the alignment channel. This is illustrated in FIG. 1 of the application, which schematically shows a substrate 10 on which an optical device is formed. The substrate 10 has formed on its surface a channel 12 having a width selected to accommodate the nominal channel diameter. The channel 12 has a rectangular cross section. When a fiber 14 having a diameter smaller than the nominal fiber diameter is placed in the channel 12, the fiber typically aligns in contact with one or the other walls of the channel 12. This causes the core 16 of the fiber 14 to be displaced to one side and misalign with the input or output of the optical element.

Figure 2:
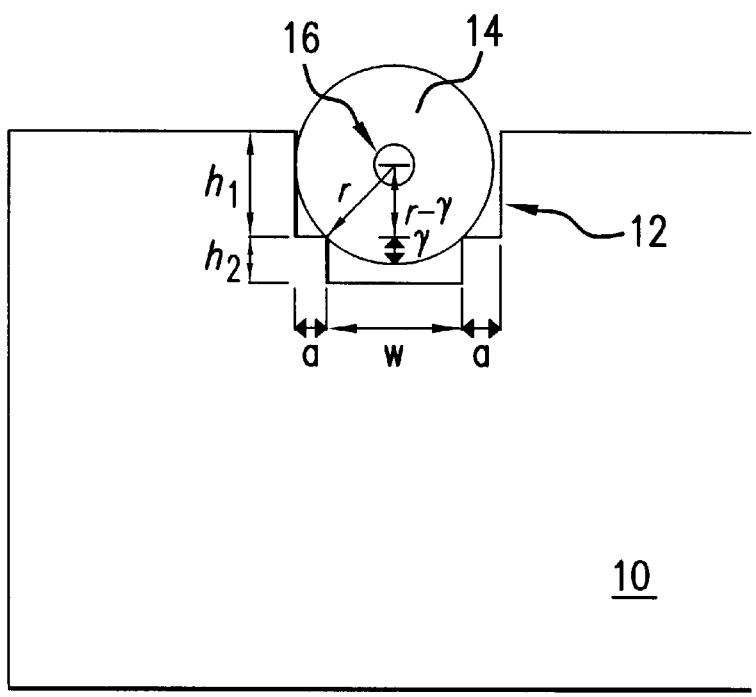
FIG. 2 shows a more precise, stepped alignment channel formed on a surface of a substrate, with a fiber positioned within the stepped alignment channel so that the core of the fiber is centered within the alignment channel.

A more reliable strategy for aligning a fiber to an optical component is illustrated in FIG. 2. As with the illustration in FIG. 1, the substrate 10 is the substrate on which an optical component is formed. One or more optical fibers is coupled to the optical component to connect the optical component with other optical devices, such as an optical network. A stepped channel 18 is formed on a surface of the substrate 10 to align the fiber with an input or output port of the optical component. As shown, the stepped channel 18 preferably includes a first rectangular recess from the surface with a further rectangular recess extending away from the surface of the substrate 10. The further recess extends to a depth selected so that the lowest surface of the fiber is spaced from the bottom of the lower recess, with the further recess preferably centered on the bottom of the first recess. Centering the lower recess within the bottom of the upper recess is not critical, but is instead useful for conserving space. This stepped channel, with appropriate dimensions, causes the optical fiber 14 to be supported on the corners between the upper and lower recesses so that the fiber is supported along two lines on its outer surface.

The stepped channel configuration illustrated in FIG. 2 has the advantage of reliably centering the fiber within the channel, making the illustrated notched groove a self-aligning structure. While there may be some variations in the height of the fiber core within the channel, this variation is significantly less than in the rectangular channel configuration of FIG. 1. Moreover, if the notched groove is used for aligning two fibers with respect to each other, selecting fiber pairs with equal dimensions can accommodate variations in fiber dimension. Equal fiber dimensions might be achieved, for example, by creating the fiber pair by cutting a single fiber and coupling the two cut ends of the optical fiber to couple to the optical component. The improved alignment provided by the stepped channel of FIG. 2 is preferably achieved by selecting appropriate dimensions for the dimensions of the channel. The width at the top of the channel is $w+2a$ and the width of the lower channel is $w$; the depth of the first recess portion is $h_1$ and the depth of the lower recess from the floor of the first recess is $h_2$. The depth by which the fiber extends into the lower portion of the recess is indicated in FIG. 2 by $\gamma$ and the fiber radius is illustrated as $r$.

Taking these definitions, the alignment channel preferably is made so that the $h_2 > \gamma$, so that the fiber does not touch the lowest surface of the channel. The height of the first step preferably is selected to be is less than the diameter of the fiber, $h_1 + \gamma < 2r$, so that a portion of the fiber extends above the surface of the stepped channel. The width of the channel preferably is selected to be equal to or greater than the diameter of the fiber, $w+2a \geq 2r$, providing sufficient allowance that the expected range of fiber diameters fit within the alignment channel. As an example, the dimension $h_1$ might be 80 $\mu$m and the channel width $2a+w$ might be selected to be 127 $\mu$m, or the nominal fiber diameter of 125 $\mu$m plus an allowance of 2$\mu$m. The width w of the lower recess may be selected to be 80$\mu$m and the height of the lower recess $h_2$ might be selected to be at least 15$\mu$m. Considering manufacturing tolerances, the height $h_2$ might be selected to be 20$\mu$m. A method for manufacturing the self aligning stepped channel structure of FIG. 2 is now described with reference to FIGS. 3–8.

Figure 3:
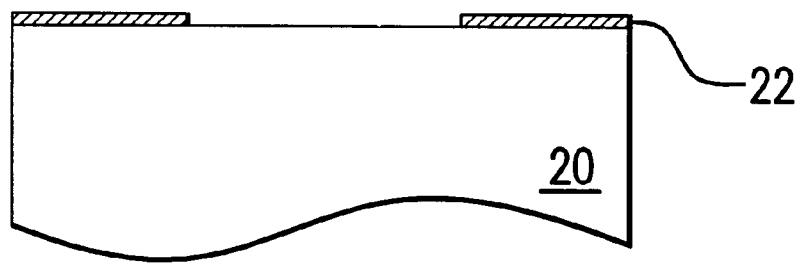
FIGS. 3–8 show a preferred process flow for manufacturing the FIG. 2 fiber alignment structure.
Figure 4:
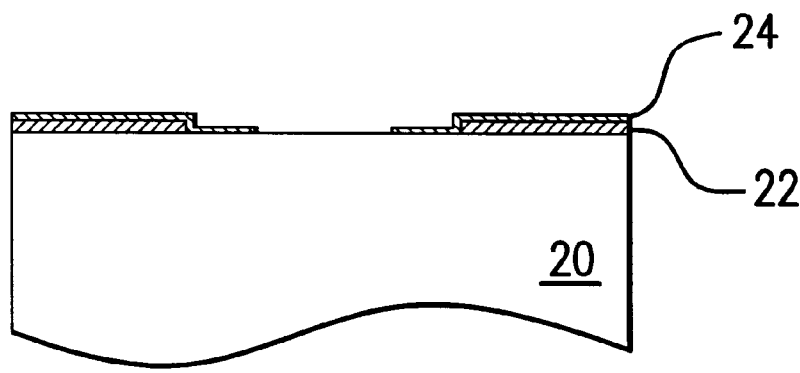

The alignment channel is preferably formed on the same substrate as the optical component to which the fiber is to be coupled. This configuration provides a desired integration with an improved manufacturing simplicity. For many optical components, the substrate 20 is single crystal silicon. For the optical components described below, a preferred substrate 20 is a (111) face of a silicon wafer. The desired stepped or notched alignment channel is formed using a double mask procedure and a deep etching process of the type known in the micro-electro-mechanical systems ("MEMS") art. A first etch mask 22, shown in FIG. 3, is provided on the surface of the substrate 20 with an opening in the mask matching the desired width $2a+w$ of the upper recess of the stepped alignment channel. A second etch mask 24, shown in FIG. 4, is provided over the first etch mask 22 and over the surface of the substrate 20 so that the opening in the second etch mask 24 exposes a portion of the substrate equal in width to the desired width of the lower recess.

The two etching masks 22 and 24 might be made of different materials, but in the preferred and illustrated embodiment the first and second etching masks are both oxide. Oxide is selected because it is particularly compatible with the deep anisotropic etching process preferably used in manufacturing the stepped alignment channel of FIG. 2 and so the two etching masks 22 and 24 are preferably both oxide. The masks are formed in the conventional process, for example, by low pressure, atmospheric pressure or plasma enhanced chemical vapor deposition (LPCVD, APCVD or PECVD) followed by forming a photoresist mask using conventional photolithography. In some embodiments, tetraethylorthosilicate ("TEOS") can be used as a source for the oxide deposition and PECVD is used to deposit the oxide from the TEOS source. It is also possible to use thermal oxide or photoresist as etch masks for the deep etching process.

Figure 5:
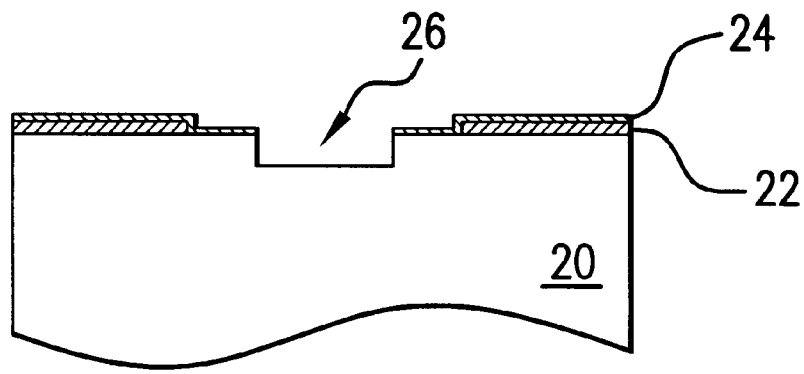
Figure 6:
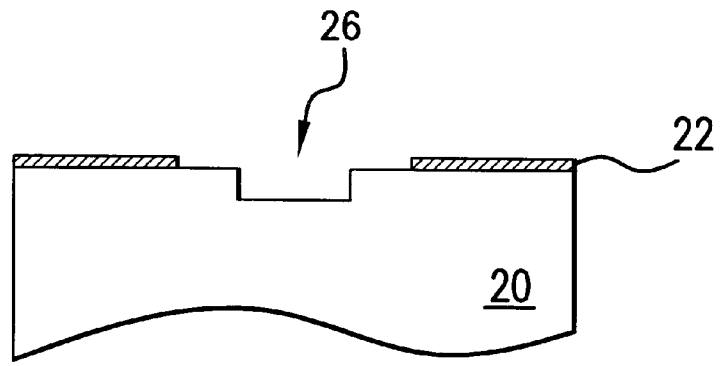

After the two masks 22 and 24 are provided on the surface of the substrate 20, the substrate is etched in the region exposed within the mask to a depth equal to the height $h_2$ desired for the lower recess of the stepped channel structure, as shown in FIG. 5. This etching preferably is an anisotropic, reactive ion etching process using what is known as the Bosch process, developed by Robert Bosch GmbH of Germany. Etching equipment that provides an automated implementation of the Bosch process is commercially available, for example, from Surface Technology Systems, Ltd. of Newport, Wales or Alcatel Thin Film Systems of Paris, France. Typically the reactive ion etching process might be implemented using an inductively coupled plasma-etching reactor. After the recess 26 is etched to a preferred depth of $h_2$, the second etch mask 24 is removed, for example, by an anisotropic etch back process, stopping in part on the surface of substrate exposed by the first etch mask 22, as shown in FIG. 6. FIG. 6 shows that sidewall regions are formed along the edges of the first mask 22 during the anisotropic etch back process. Preferably, the width of these sidewall regions is accommodated in selecting the width of the opening in the first mask 22.

Figure 7:
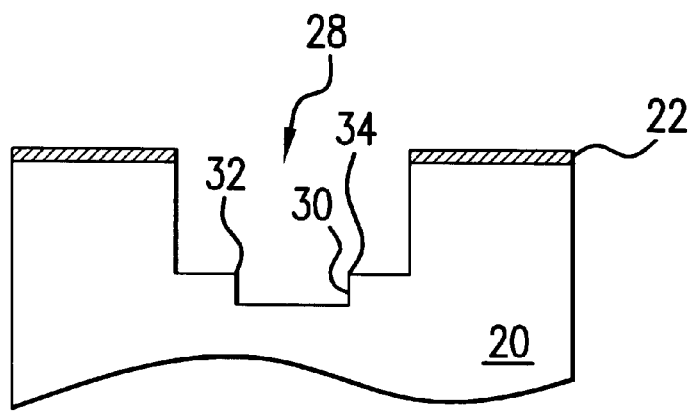
Figure 8:
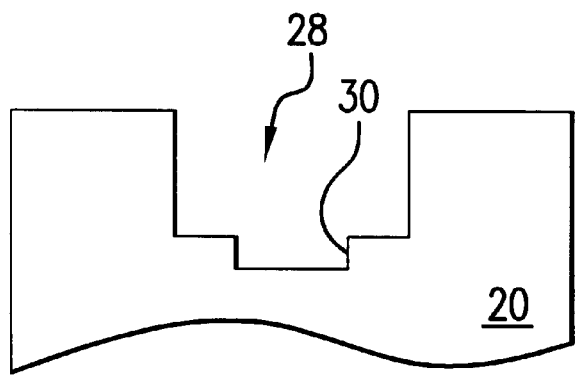

The substrate 20 is then etched as exposed by the first mask 22, also using the preferred deep etching process, with the second etch continuing to a desired depth equal to the desired depth $h_1$ of the upper recess. This produces the desired stepped channel cross section 28, as shown in FIG. 7, with the edges 32 and 34 of the lower recess 30 provided as the aligning components of the illustrated structure. The first mask 22 is then stripped, producing the structure illustrated in FIG. 8. If, for example, the first mask is silicon oxide, the mask might be stripped in a hydrofluoric (HF) acid solution. As is discussed in greater detail below, the alignment structure of FIG. 8 often undergoes further processing in which a reflective layer, such as aluminum, gold, titanium-gold or chromium-gold, is deposited over the FIG. 8 structure. Such a reflective layer might be provided, for example, to render opaque silicon that is partially transparent in its as-manufactured state so that the silicon can block incident light.

The fiber alignment channel discussed above with reference to FIGS. 2–8 provides improved alignment of fibers with respect to fixed optical inputs or outputs with reduced hand labor. When two fibers are aligned using such a structure, it is possible to align the two fibers using two alignment channels formed in a common process flow to provide an even higher degree of alignment accuracy. This discussion now turns to an optical component that is a useful application of the alignment channel. It will be apparent to those of ordinary skill that, while the following describes an optical component of particular utility and advantage, the alignment channel illustrated in FIGS. 2–8 can be advantageously implemented to access a variety of other optical components. Moreover, while the alignment channel of FIGS. 2–8 is particularly easily implemented in a silicon substrate, the illustrated structure can be implemented in substrates formed from other materials.

Figure 9:
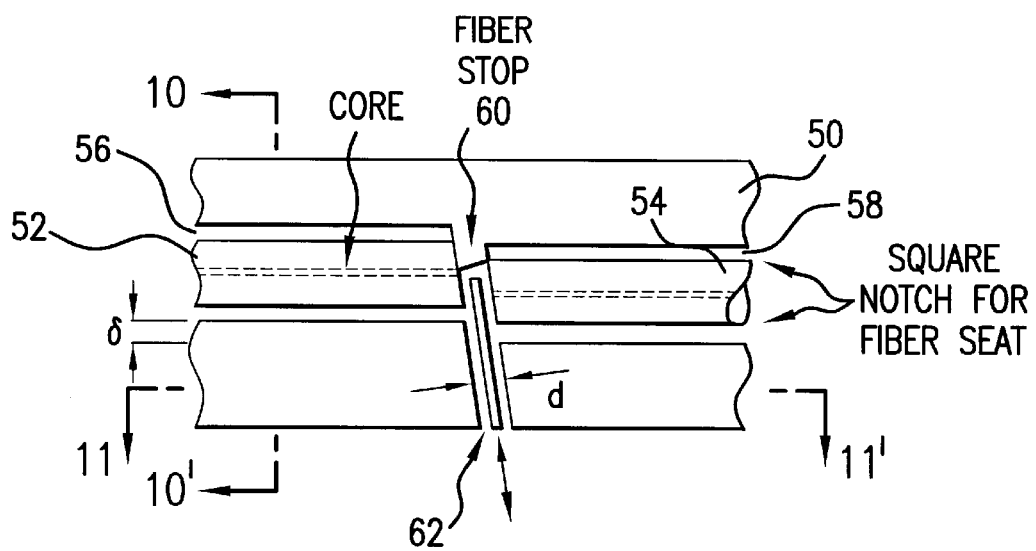
FIG. 9 provides a schematic detail view of a shutter that selectively transmits and blocks light between two fibers.

FIG. 9 shows an ON/OFF switch that includes a micromechanical shutter between two optical fibers. This optical switch provides a coupling between two fibers that is selectively opened and closed by the application of an electrical signal that causes a shutter to move laterally within an open portion of an optical path defined primarily by two fibers within the switch. When the shutter is positioned between the two optical fibers, the shutter blocks the optical path and prevents coupling between the two fibers. When the shutter is withdrawn from the optical path, light propagates between the fibers providing coupling between the fibers. In preferred implementations of the optical fiber switch, the shutter can be latched in one or the other of its open or closed positions, preferably by a micro-mechanical latch, so that the shutter position is maintained without applying a continuous electrical signal to the switch. In a particularly preferred implementation, the optical switch might have a normally closed position in which the shutter is held in position by spring force. The shutter is withdrawn from the optical path to provide the open state of the switch and the latch may be engaged to hold the switch in this open state. The shutter remains in this open state until electrical signals are applied to disengage the latch.

Figures 10, 11:
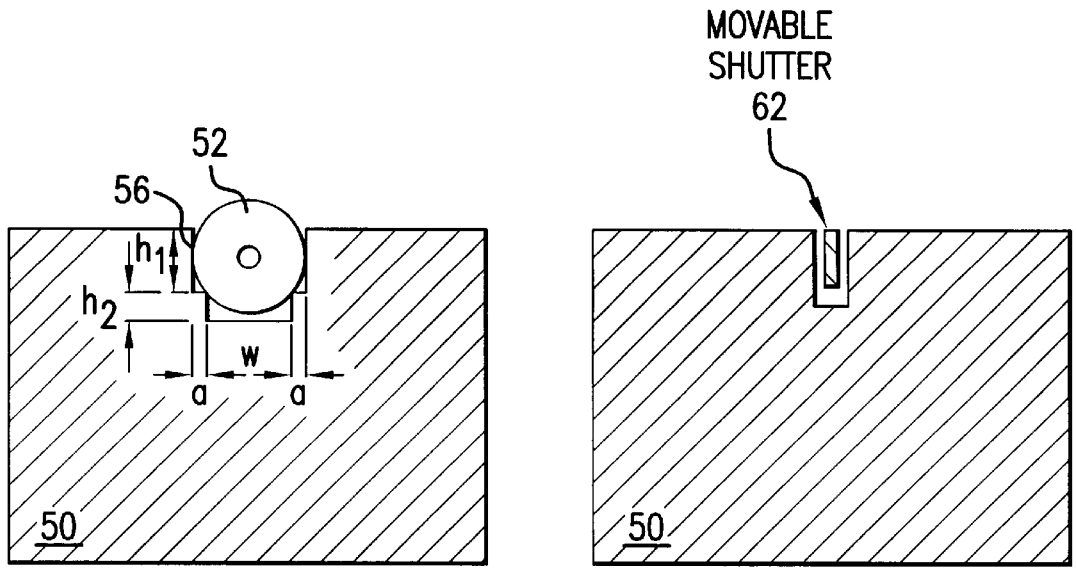
FIG. 10 illustrates a view taken along a cross section through the shutter illustrated in FIG. 9.
FIG. 11 illustrates a second view taken along a second cross section through the shutter illustrated in FIG. 9.

FIG. 9 schematically shows an overview of an optical switch formed on a substrate 50, where the switch controls the coupling between a first fiber 52 and a second fiber 54. The preferred material for the substrate 50 is single crystal silicon, although it is feasible to make the illustrated structure out of other materials. Using a silicon substrate and silicon processing is believed to provide manufacturing accuracy, predictability and reduced costs. A first alignment channel 56 like that illustrated in FIG. 2 is provided on the left side of the substrate to hold the first fiber 52 in position. A second alignment channel 58 is provided on the right side of the substrate 50 to hold the second fiber 54 in position. FIG. 10 shows a cross section through the first alignment channel 56 with the fiber 52 positioned within the channel 56 for accurate positioning and alignment. The alignment channels 56 and 58 are preferably formed in a common series of process steps so that the widths of the upper and lower recess and the depths of each recess are formed in common process steps. This preferred strategy takes advantage of the inherent accuracy of the preferred silicon processing. Furthermore, any process variations that occur will be common to both of the alignment channels to achieve more precise alignment.

The two fibers 52 and 54 are positioned within their respective alignment channels 56 and 58 so that each fiber abuts a fiber stop 60 positioned between the two alignment channels. The fiber stop 60 establishes a separation between the ends of the two fibers and the thickness of the fiber stop establishes the separation d between the ends of the two fibers. A moveable shutter 62 is shown positioned between the two fibers. The shutter can be translated laterally along the indicated direction to approach the fiber stop in the OFF position of the switch and to be withdrawn from between the fibers in the ON position of the switch. FIG. 11 shows a cross section through the shutter 62 and the substrate and shows that the shutter is free floating along this cross section. As is discussed below, particularly preferred embodiments of this aspect of the invention form the shutter out of the single crystal silicon of the preferred silicon substrate 50.

It should be noted that the thin silicon shutter is partially transparent in its as-manufactured state, particularly at the typical near to mid infrared wavelengths of light predominantly used in optical communications networks. Preferably the shutter 62 is coated with a reflecting material such as a metallic coating to render the shutter opaque. For example, the shutter 62 might be coated with a thin film of aluminum or gold, a layered structure including an inner layer of titanium and an outer reflective layer of gold, or a mixture of chromium and gold, with these thin films deposited in a sputtering process. Because the shutter is preferably positioned in the open space between two alignment channels, there is typically ample room to provide a desirable thick and uniform layer of metal in a sputtering process. Such a thin metal film is preferred as being a cost-effective broadband reflector that is effective at various angles and at various wavelengths of light. An alternative to a thin metal film might, for example, be a multilayer dielectric stack, but such stacks are expensive to design and manufacture and typically have reduced effectiveness for light incident at an angle.

As shown in FIG. 9, the two alignment channels 56 and 58 are offset laterally with respect to each other so that the respective cores of the fibers 52 and 54 installed within the alignment channels are offset with respect to each other. The ends of the fibers are angled, preferably at angle of 8° or greater with respect to a plan perpendicular to the propagation direction of the fiber. Providing an angled end to the fibers and a reflecting shutter ensures that light from the core of the fibers will walk off without coupling into the other fiber or back into the same fiber when the shutter is closed. Light leaves the angled end of the fiber at an angle away from the perpendicular to the angled end of the fiber, as suggested by a simple application of Snell's law. The angle of the face of the fiber is preferably selected to ensure that a sufficiently small amount of light is reflected from the shutter and back into the fiber when the shutter is closed. The lateral offset between the fibers is selected in view of both the angle on the face of the fiber and the distance between the two fibers so that the light exiting the fiber face at an angle is directed at the core of the other, receiving fiber.

Figure 12:
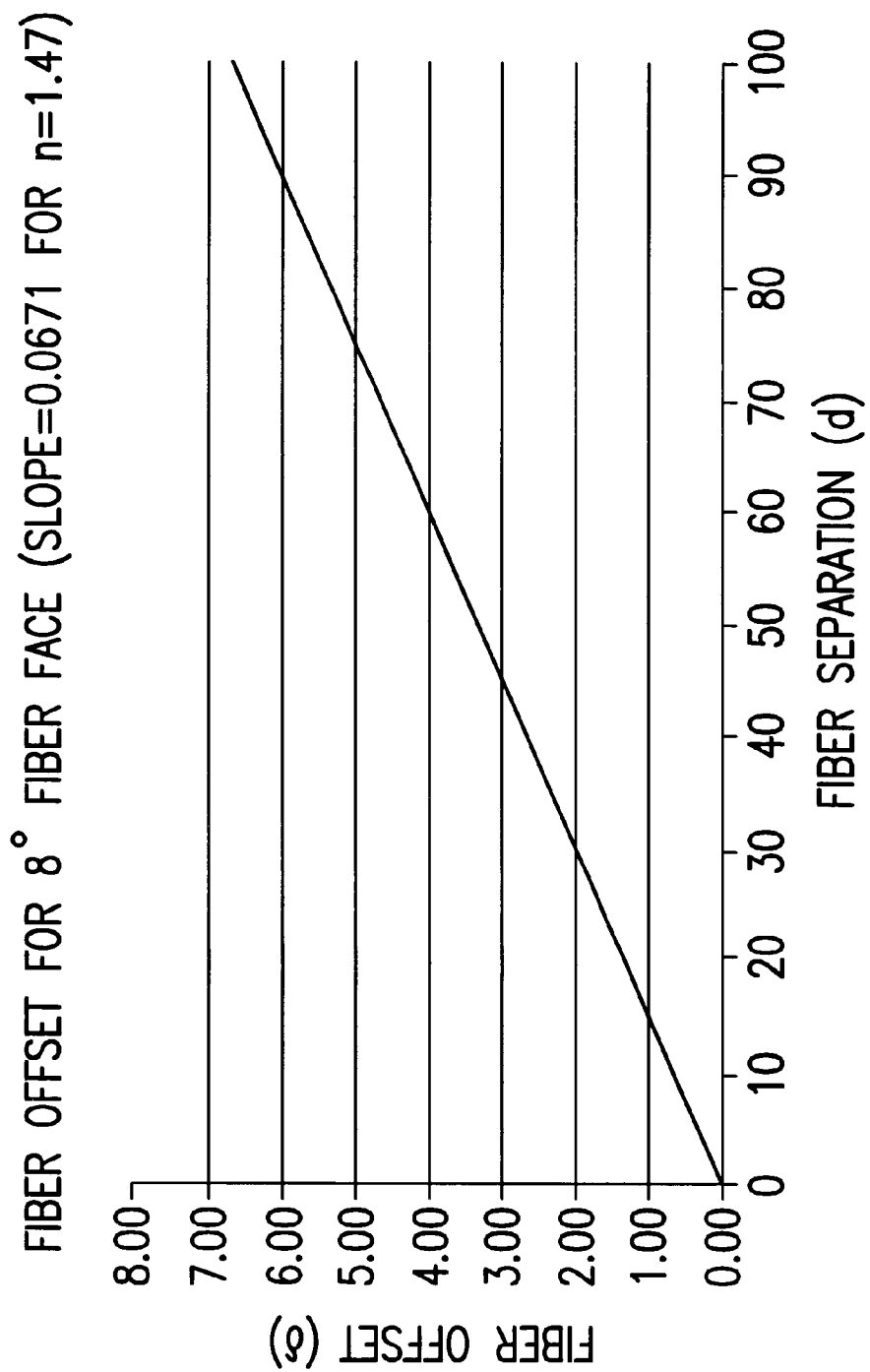
FIG. 12 illustrates a preferred relationship between the offset between the two fibers of FIG. 9 and the separation between the ends of the two fibers.

Offsetting the fibers in the illustrated manner and separating the fibers by a desired distance provides a preferred coupling of the light from one fiber to the other fiber without light undesirably being reflected back into the originating fiber when the shutter is open. FIG. 12 illustrates a relationship between the lateral offset δ between the two fibers and the separation d between the ends of the fibers. This is an illustration of one implementation strategy. Other relationships are known for different types of fibers and geometries. It should be understood that the illustrated offsets and angles are exaggerated to illustrate the strategy better.

Figure 13:
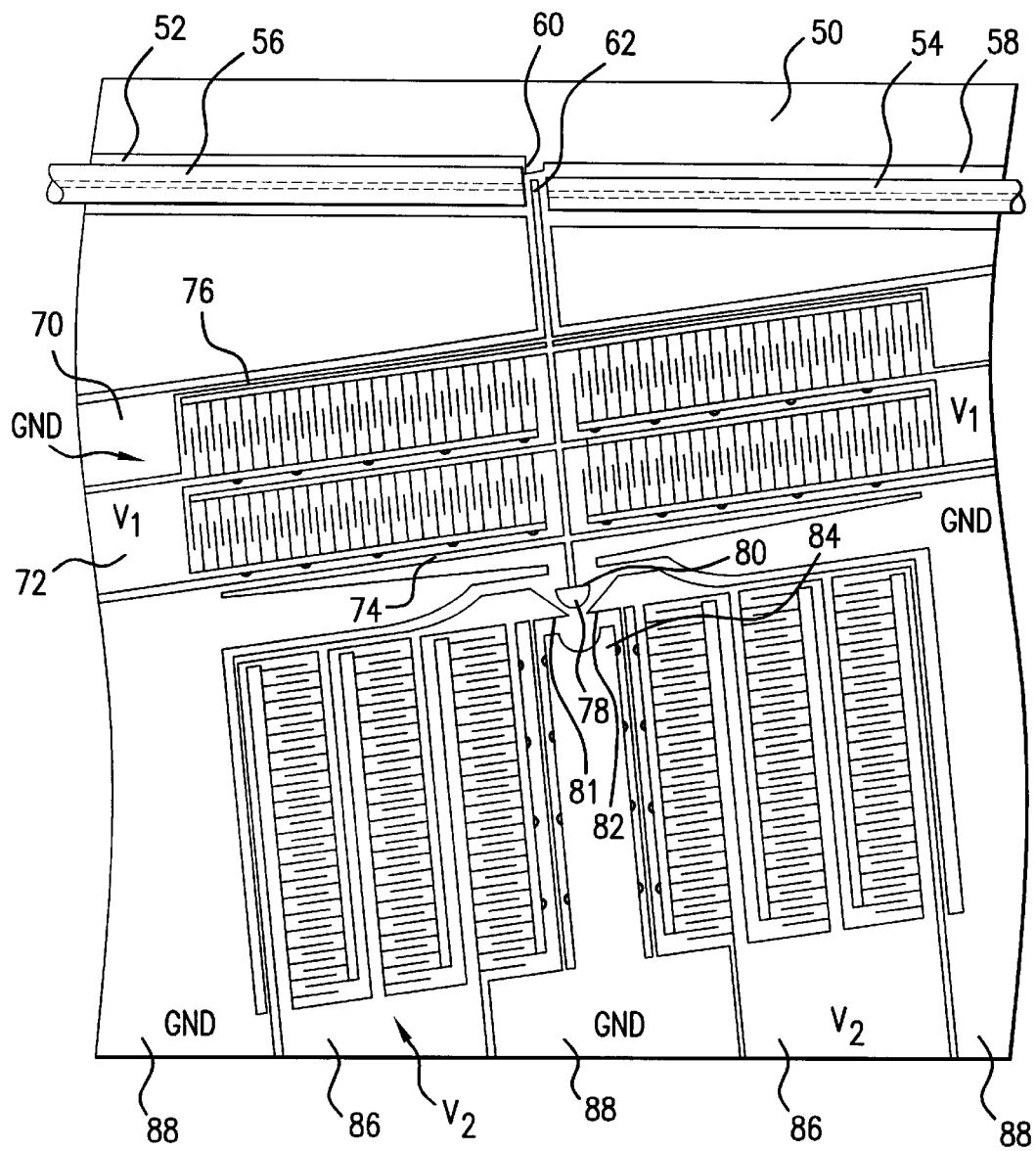
FIG. 13 provides an overview of an implementation of the shutter schematically illustrated in FIG. 9.

More detailed aspects of an implementation of the switch of FIG. 9 are shown in FIG. 13. FIG. 13 is an enlarged, largely proportional illustration of the switch of FIG. 9 as the switch would be implemented in a silicon substrate using micro-electro-mechanical systems (MEMS) fabrication strategies. It will be understood that other materials might be used, but this discussion is in terms of silicon fabrication techniques for ease of understanding. The various features of the switch are identified in FIG. 13 with the same numerals as are used in FIG. 9 for ease of comparison. The FIG. 13 also illustrates the electrodes to which electrical signals are applied to move the shutter 62. In this illustration, the shaded areas represent electrode structures and the surrounding white regions represents trenches surrounding the electrodes. At least for the thinner regions, the electrodes of the FIG. 13 illustration are separated from the underlying substrate 50 so that the electrodes are free to move under the application of electrical signals. Thus, the electrodes are mechanically long, unsupported beams that can move in response to applied forces.

The electrodes have generally rectangular cross sections and primarily have the comb structure that allow opposite conductivity electrodes to have alternating fingers in an interdigitated configuration. The illustrated configuration is advantageous in that the electrodes have a high proportion of facing surface area, which increases the amount of charge that can be distributed over the surface of the electrodes. Connecting the electrodes to one or more voltage supplies or potentials or, equivalently, applying charge to either one or both of the electrodes creates a force between the two electrodes and causes the electrodes to be translated or deflect. As the electrodes translate, deflect or deform they translate structures attached to the electrodes. For example, electrodes 70 and 72 control translating the shutter 62 laterally between its fully extended and its withdrawn positions. When no charge is applied, the shutter is in its extended position. To open the optical switch, opposite charges are applied to the electrodes to cause them to attract each other. For example, in FIG. 13 a ground potential GND is applied to electrode 70 and a potential $V_1$ is applied to electrode 72 to cause the electrodes to attract. The attractive forces between the electrodes are distributed over the length of the electrodes, translating the electrodes with respect to each other and consequently translating the structures attached to the electrodes.

Note that the long beam 74 attaches the shutter 62 to spaced apart regions of the substrate. This long expanse of unsupported beam can deform to a large extent as the shutter is translated into its withdrawn position, applying a spring force to assist in returning the shutter to its extended position. Other, similar structures like beam 76 might be provided as further springs to hold the shutter in its normal closed position. The springs 74 and 76 tether their respective electrodes to the substrate. Thus, when charge or potential is applied to the electrodes 70 and 72 to translate the electrodes, the electrode translation results in a deformation of the springs 74 and 76 and a restorative spring force to return the electrodes to their nominal OFF position.

For the illustrated structures to operate effectively, it is particularly preferred that the opposing electrodes 70, 72 be sufficiently conductive as to distribute charge substantially uniformly over the surface of the electrodes. This is preferably accomplished by using conductive silicon as a starting material. Such silicon is doped during growth, for example N-type, and preferably to a high level. This strategy provides entire electrodes that are conductive, but the entire volume of the electrodes need not be conductive. Appropriate electrodes might have only their opposing surfaces conductive. For example, the opposing surfaces of the two electrodes might have a continuous conductive plating or coating.

FIG. 13 shows that the end 78 of the shutter 62 is shaped to be held by a latch, so that the shutter can be held in place by a purely mechanical structure. When latched, the end 78 of the shutter 62 is positioned so that its flat rear portion 80 is captured by the flat portions 81, 82 of the latch and the rounded end is received by the corresponding centering portion 84 of the substrate. The rounded portion serves to center the shutter within the latch so that the shutter does not deflect to such an extent that the shutter becomes unlatched. The illustrated latch captures the end 78 of the shutter and holds the shutter in its withdrawn position, against the spring forces, so that the shutter is held in position without applying electrical forces.

Figure 14:
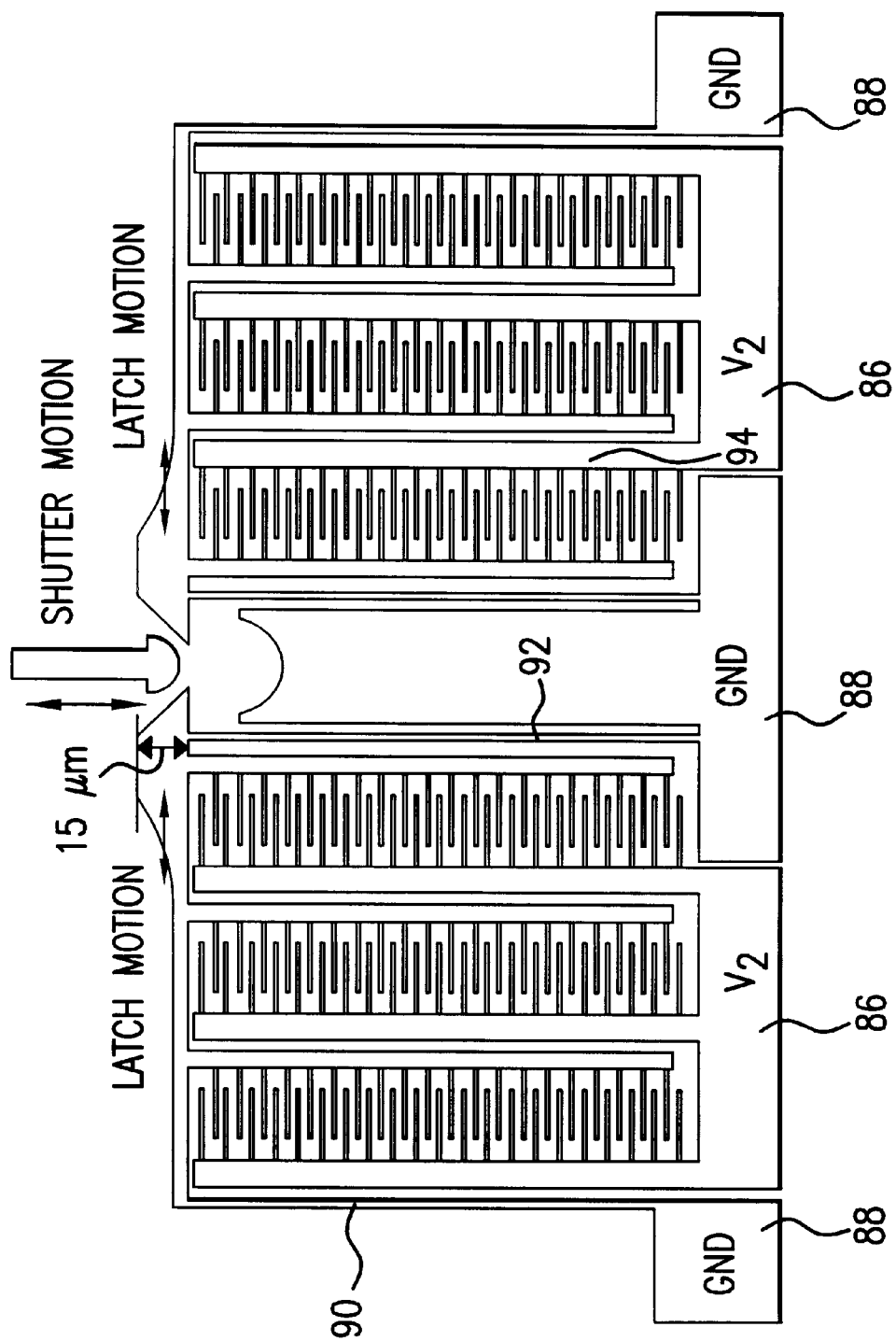
FIG. 14 provides a more detailed view of the latch illustrated in FIG. 12.
Figure 15A:
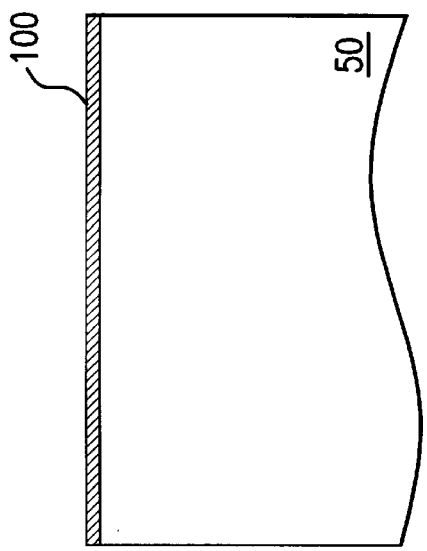
FIGS. 15–25 illustrate a process flow for forming the structures illustrated in FIGS. 9 and 13.
Figure 15B:
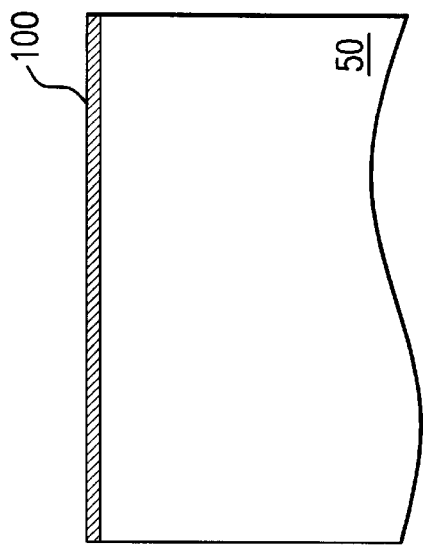
Figure 16A:
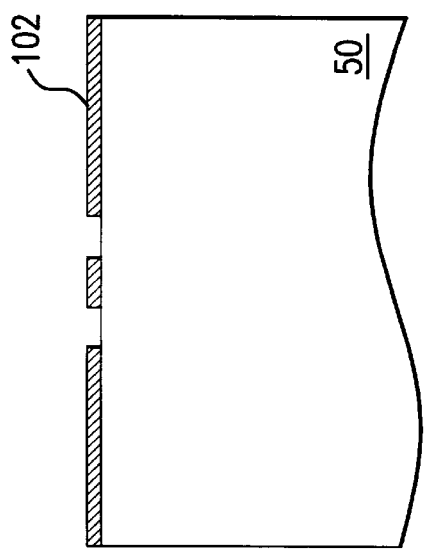
Figure 16B:
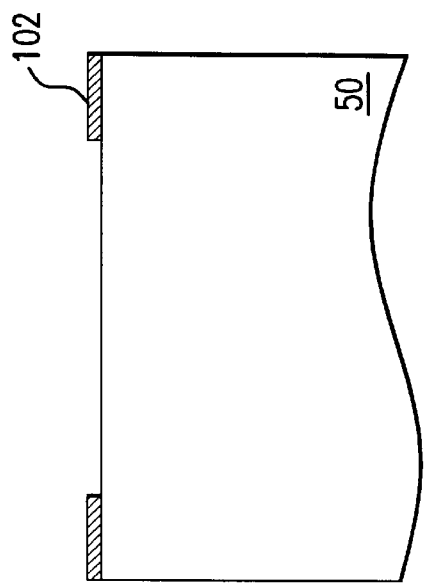

The mechanical elements of the latch structure are much like those described with respect to the shutter and its translation. FIG. 14 shows the latch and the end of the shutter. Electrodes 86 and 88 have the comb structure that provides a high amount of surface area on the electrodes that efficiently makes use of the applied charge or potential. As shown, the latch is normally closed and is held in its normally closed position by springs such as those formed by the long beams 90 and 92. It should be apparent that structures that are intended to deflect and structures intended to act as springs have thinner lateral dimensions. Structures such as the electrode support 94 that are intended to not move or that are intended to translate with other structures have thicker lateral dimensions. As discussed above, the electrodes desirably have at least opposing surfaces that are conductive.

To capture the shutter within the latch, opposite charges or potentials are applied to the two sets of electrode 86, 88. For example, a voltage of $V_2$ might be applied to electrode 86 and a ground potential GND might be applied to electrode 88. Those of ordinary skill will appreciate that the potentials used to open the latch and to translate the shutter are determined by the particular geometry and materials used. After application of appropriate voltages to open the latch, appropriate voltages are applied to the shutter to translate the end of the shutter into the receiving portion of the latch. The voltages holding the latch open are then released and the latch is allowed to close. At this point, the latch is a purely mechanical device holding the shutter in position against a spring force. To release the shutter and thereby to close the switch, voltages $V_2$ and GND are applied to electrodes 86 and 88 to open the latch and then the shutter is translated out of the receiving portion of the latch. Generally, the air damping of the illustrated system is sufficient to allow the latch to return to its normal OFF position in a controlled manner. It is of course possible to further control the shutter motion by applying voltages to the shutter translation electrodes 70, 72 to counter the spring force and translate in a more controlled manner.

The following describes two preferred techniques for forming the shutter, latch assembly and optical component illustrated in FIG. 13. The processes described below include or are integrated with the processes illustrated in FIGS. 3–8 and described above for forming alignment channels 52, 54. The illustrations of FIGS. 15–25 show the formation of the beams and other component structures of FIG. 13 substantially at the same time that the alignment channels 52, 54 of the FIG. 13 optical element are formed. The left figure of each figure pair, designated by (a), illustrates the formation of an unsupported beam or other component structure and the right figure of each pair, designated by (b), illustrates the formation of an alignment channel.

The process flow illustrated in FIGS. 15–25 takes advantage of a set of preferred manufacturing properties associated with a particularly preferred face of a silicon substrate. Other directions on silicon substrates can be used. In addition, as discussed above, other substrate materials might be used. At the present time, however, silicon is a preferred substrate material and the (111) face of silicon provides certain processing advantages. Use of the (111) surface of silicon as the manufacturing surface allows the use of preferential lateral etching of the silicon substrate in the structure release process. The advantages of using the (111) surface of silicon and the methods used in processing on that face of silicon are described, for example, in U.S. Pat. No. 6,150,275 to Cho, et al., entitled "Micromechanical System Fabrication Method Using (111) Single Crystalline Silicon," which patent is hereby incorporated by reference in its entirety.

The substrate 50, most preferably a (111) face of single crystal silicon, is covered by deposition of the material 100 that will be formed into the first etching mask. Most preferably layer 100 is deposited to a thickness sufficient to protect the silicon substrate through an extended deep etching process used to define the height of components including beams and the height of alignment channel. For example, layer 100 may be oxide deposited to a thickness of approximately 1 micron by LPCVD, APCVD or PECVD (FIG. 15) to withstand a deep etch into a silicon substrate to a depth of 75 microns or more. Alternatively a layer of photoresist might be patterned and used as the mask layer, itself. Layer 100 is patterned using conventional photolithography to form etch masks 102 over both component and alignment channel sections of the optical component. The etch mask 102 over the component substrate (FIG. 16(*a*)) has openings that define the width of trenches formed on either side of the beams and other component structures formed in processing. In the alignment channel substrate, the mask 102 has an opening sized to define the width of the upper recess for the alignment channel.

Figure 17A:
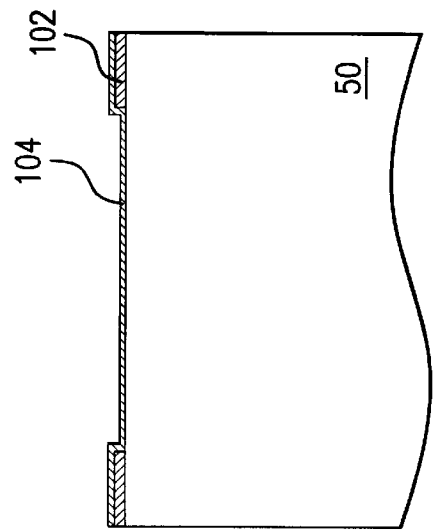
Figure 18A:
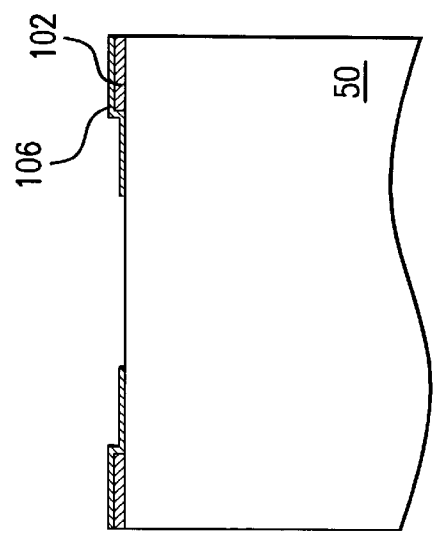
Figure 17B:
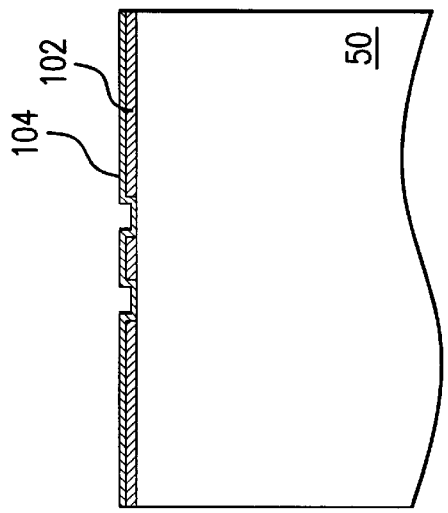
Figure 18B:
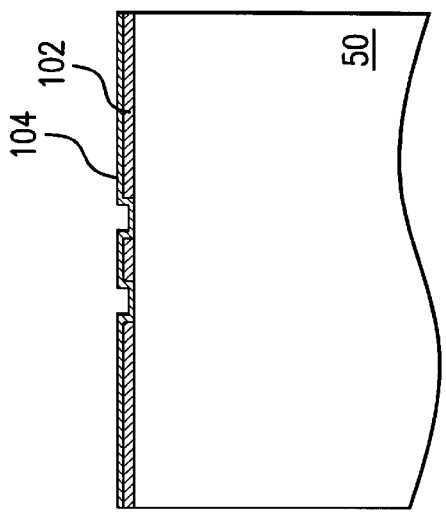

A layer 104 of masking material, for example another layer of oxide, is then deposited to a comparatively thin thickness of 0.2 microns (FIG. 17). Conventional lithography patterns layer 104 in the alignment channel region of the substrate (FIG. 18(*b*)), while a blocking photoresist layer protects the layer 102 over the component substrate so that layer 102 remains intact over the surface of the component substrate. The processing provides a mask 106 with an opening sized corresponding to the width of the lower recess of the alignment channel. The two etching masks 102 and 106 might be made of different materials, but in the preferred and illustrated embodiment the first and second etching masks are both silicon oxide. Silicon oxide is selected because it is particularly compatible with the deep anisotropic etching process preferably used in manufacturing the stepped alignment channel.

Figure 19A:
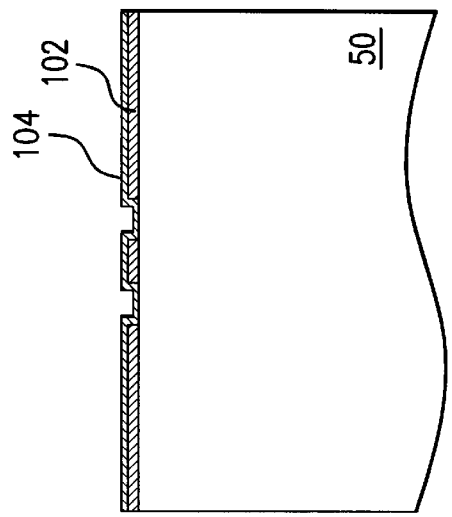
Figure 19B:
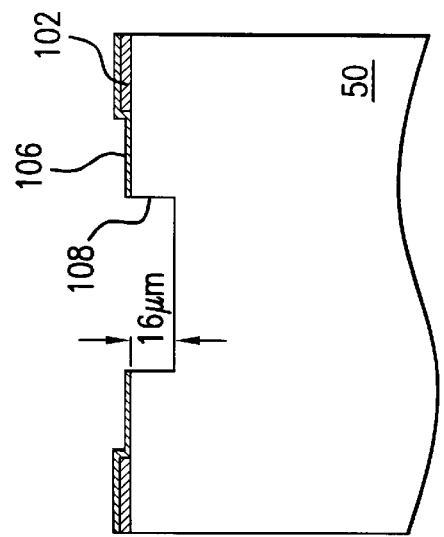
Figure 20A:
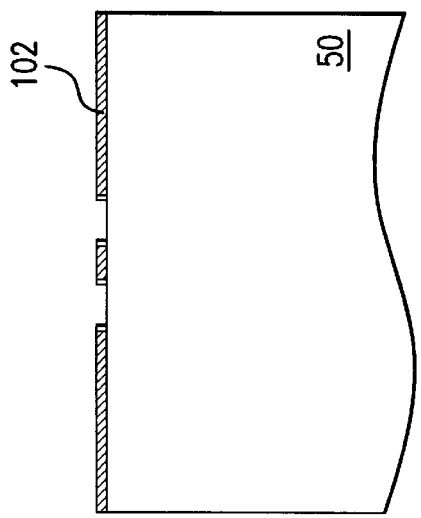
Figure 20B:
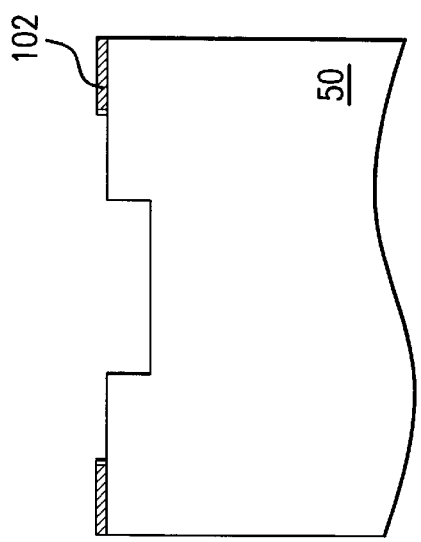

Deep anisotropic etching through the opening in the channel etching mask 106 removes the exposed surface of the substrate 50 to a depth desired for the lower recess of the stepped channel structure, as shown in FIG. 19(*b*). In the illustrated embodiment the depth of the first etch is shown as 20 microns, which generally corresponds to the lower recess depth discussed above. This etching is preferably an anisotropic, reactive ion etching process using the Bosch process, discussed above. During this process, the portion 104 of the mask over the component substrate protects the component substrate from the etching environment. After the lower recess 108 is etched to a preferred depth, the second etch mask 104, 106 is removed, for example, by an anisotropic etch back process, stopping in part on the surface of substrate exposed by the first etch mask 102, as shown in FIG. 20. FIG. 20 shows that sidewall regions are formed along the edges of the first mask 102 during the anisotropic etch back process. Preferably, the width of these sidewall regions is accommodated in selecting the width of the openings in the first mask 102.

Figure 21B:
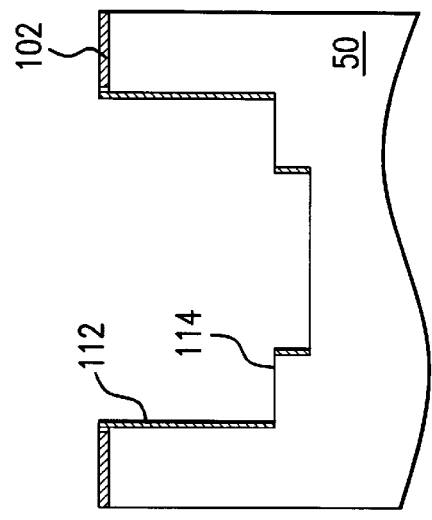
Figure 21A:
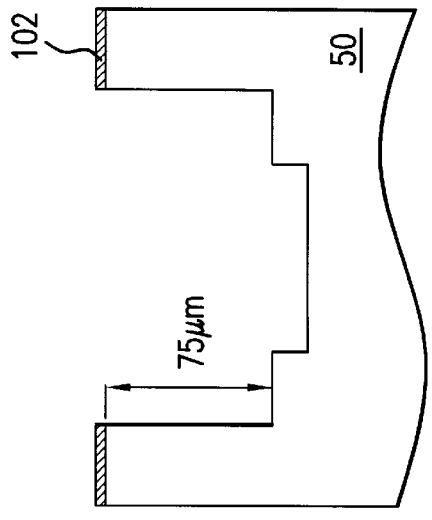
Figure 22B:
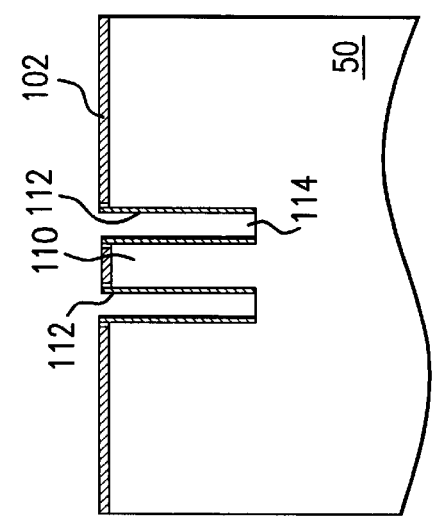
Figure 22A:
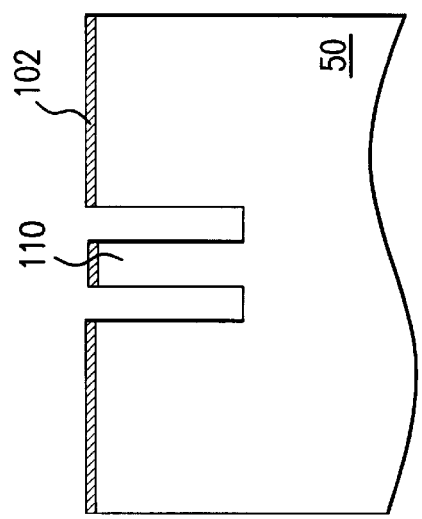

The preferred deep etching process etches the substrate 50 where exposed by a the first mask 102, as shown in FIG. 21, with the second etch continuing to a desired depth slightly less than the desired depth of the upper recess portion of the alignment channel. As illustrated in FIG. 21(*b*), this depth might be on the order of 75 microns. The depth achieved in this etch is also approximately equal to the height of the beams and other component structures (FIG. 21(*a*)).

The next sequence of processing steps achieves release of the beam 110 and other component structures from the silicon substrate 50 so that such structures are capable of moving with substantial independence of the substrate 50. The release processing begins by forming protective coatings on the sidewalls of the trenches around the beam and of the channel, to protect these structures from the lateral etch used to release the beam. Preventing etching of these sidewalls provides a more precise and predictable definition to the lateral dimensions of the beam, surrounding trenches and the alignment channel. The coating 112 shown in FIGS. 22(*a*) and 22(*b*) may be silicon oxide, for example deposited by plasma enhanced chemical vapor deposition, which is then etched back in a reactive ion etching process. Etch back proceeds to clear the substrate surfaces 114 at the bottom of the trenches (FIG. 22(*a*)) and the recesses of the alignment channel (FIG. 22(*b*)).

Further deep etching proceeds to remove an additional amount of silicon, for example approximately five microns, sufficient to allow the lateral release etching. Providing a sufficient exposed silicon surface is desired to allow the etching process to proceed efficiently through good fluid flow of the etchant. This further deep etch proceeds through the openings in the first etching mask 102 and produces the further recessed surfaces 116 shown in FIG. 23. Although the lateral release etching need only be performed in the component region, this etch is preferably also performed in the alignment channel region, so that the resulting alignment channels will be better aligned with the component structures. Such alignment is not always necessary.

Figure 23A:
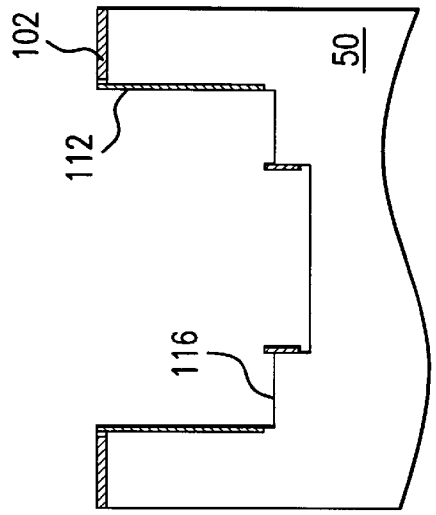
Figure 23B:
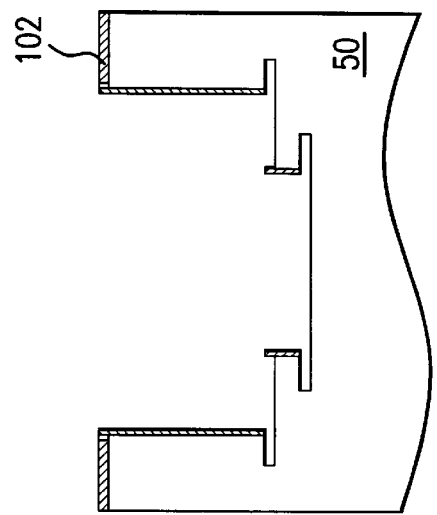
Figure 24A:
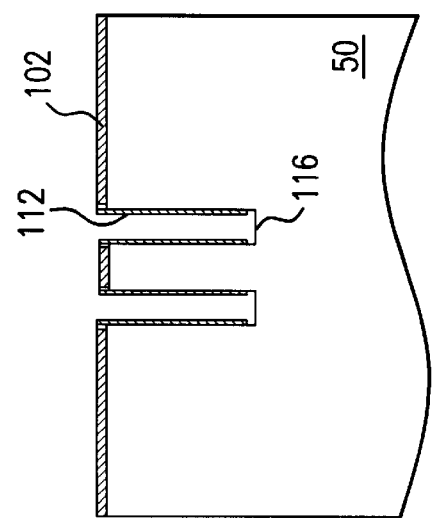
Figure 24B:
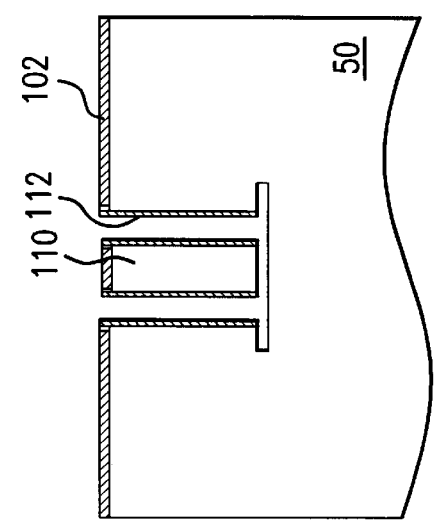
Figure 25B:
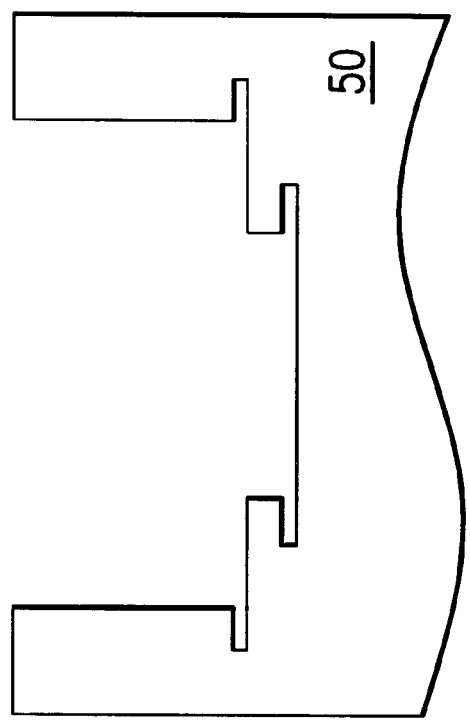
Figure 25A:
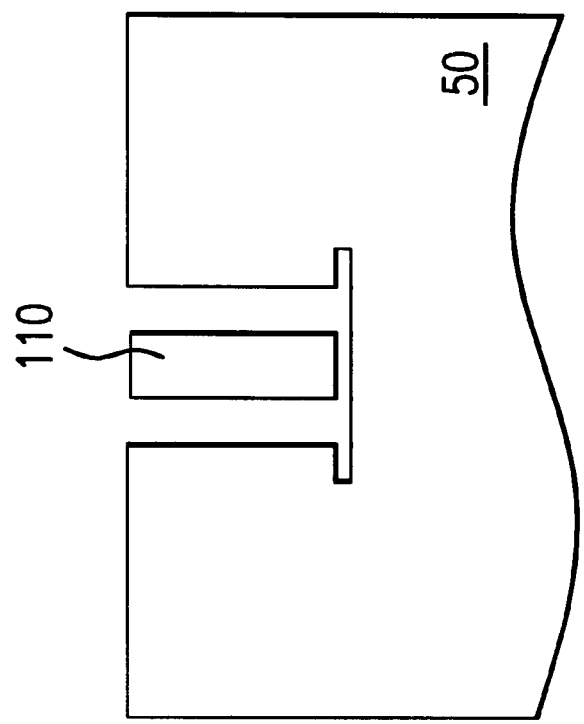

Preferential lateral release etching is then performed. Because the preferred substrate is the (111) surface of a silicon substrate, preferential etching may proceed along the various {100} and {110} planes of silicon by applying an alkaline etching solution to the exposed surfaces in the FIG. 23 illustration. Various alkaline etching solutions might be used, including KOH, ethylene diamine pyrocatechol or tetramethyl ammonium hydroxide. Lateral release etching proceeds sufficiently long to release the beam 110 and other components. This etching process also produces the desired alignment channel cross section 118, as shown in FIG. 24(*b*), with a lower recess 30 provided to effect the self-aligning aspects of the illustrated structure. The first mask 102 is then stripped, producing the structures illustrated in FIG. 25. If, for example, the first mask is silicon oxide, the mask might be stripped in a hydrofluoric (HF) acid solution.

Further processing renders the beams and other components of the electrodes conductive. This may be achieved, for example, by doping the electrodes and by forming diodes or other barriers to achieve isolation of the electrodes. More preferably, the surfaces of the electrodes are rendered conductive. This process allows more efficient isolation and achieves more uniform surface electrodes. In particularly preferred embodiments of the present invention, a multilayer structure is provided over the surface of the electrodes, with an upper electrode of the combination being a thin metal film. Advantageously, when incorporating this metal film layer, the process used to render the electrodes conductive also renders opaque the shutter, as discussed above.

Figure 26A:
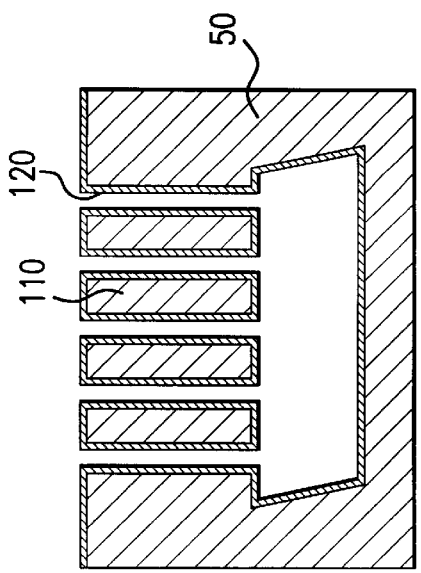
FIG. 26 shows a detail of an electrode cross section to illustrate the conductive surface of the electrode.
Figure 26B:
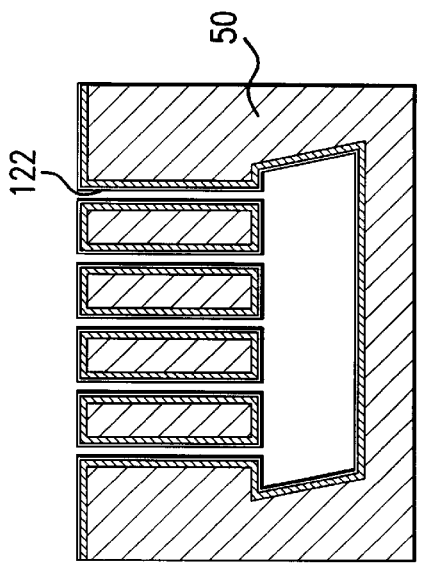

Surface conductors may be formed on the electrodes by first isolating the electrode bodies from the surface conductors that are to be formed. This may be achieved by thermally oxidizing the exposed surfaces in the illustration of FIG. 25. More preferably, a conformal oxide layer is deposited by low pressure chemical vapor deposition to avoid the different oxidation rates of the different exposed silicon surfaces and to achieve a uniform oxide thickness. The thin oxide layer is identified in FIG. 26(a) as 120. A thin layer of polysilicon 122 is then formed over the oxide layer 120, as shown in FIG. 26(b). Phosphorus chlorate diffusion or another known doping strategy is used to heavily dope the polysilicon layer, for example heavily N-type. Alternatively, boron doping by implantation or diffusion to provide a heavily P-type.

Aluminum or another metal, such as gold, titanium followed by gold, or a chromium gold mixture, is then evaporated or sputtered over the surface substrate. The metal deposition process is preferably performed with poor step coverage so that the resulting layer 124 extends only a portion of the way down the sides 126 of the trenches within the electrode regions. Alternately, the substrate may be positioned at an angle with respect to the flux and rotated to achieve the illustrated structure. On the other hand, it is preferred that this metal deposition process achieve good coverage over the shutter, at least where the shutter is positioned between the two alignment channels, so that the shutter becomes opaque. Metal is also deposited in the recesses of the alignment channels during this process. This process renders the electrodes conductive at the same time the shutter is made opaque, reducing the number of processing steps that would otherwise be required.

Figure 26C:
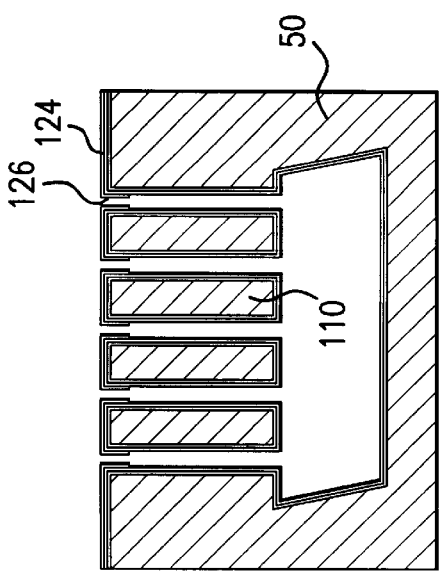
Figure 26D:
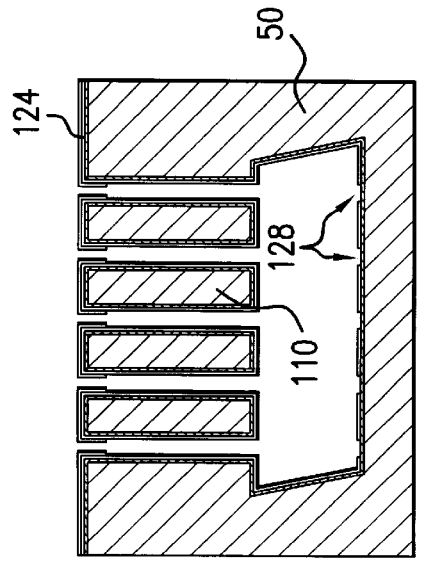

The metal deposition provides a metal layer 124 that preferably does not reach the bottom of the trenches in the small gaps in the comb drive portions of the electrodes, leaving the polysilicon layer 122 exposed along walls of the trenches, as shown in FIG. 26(c). It is especially preferred that the polysilicon layer be exposed within the undercut regions under the electrode beams or other released structures. Reactive ion etching is then performed using the aluminum or other metal layer 124 as a mask, forming open regions 128 in the polysilicon 122 and electrically isolating the trench walls and other structures, as illustrated in FIG. 26(d). In the illustration of FIG. 26, the doped polysilicon provides the desired surface conductivity to the electrodes. The evaporated or sputtered aluminum or other metal is used as an etch mask to open the regions 128 and provides improved contacts for bonding pads, used in wire bonding and not shown, but the layer 124 need not function as the conductive surface of the electrodes. Most preferably the metal layer 124 functions as a light block over the portion of the shutter that can be positioned within the optical path defined by the two fibers.

The illustrations of FIGS. 27–34 show another process for forming the switch structure of FIGS. 9 and 13. As with the process above, this illustrated process forms the beams and other component structures of FIG. 13 substantially at the same time that the alignment channels 52, 54 of the FIG. 13 optical element are formed. The left figure of each figure pair, designated by (a), illustrates the formation of an unsupported beam or other component structure and the right figure of each pair, designated by (b), illustrates the formation of an alignment channel. It should be noted that this process flow does not relate to a particular orientation of silicon. Rather, the process illustrated in FIGS. 27–34 preferably uses a buried oxide layer for easy release of the component structures such as the beams that make up the electrodes. Silicon on insulator substrates such as the illustrated substrate 130 include a buried oxide layer 132 and are commercially available or can be made in an oxygen implantation process or a bonding process.

Figure 27A:
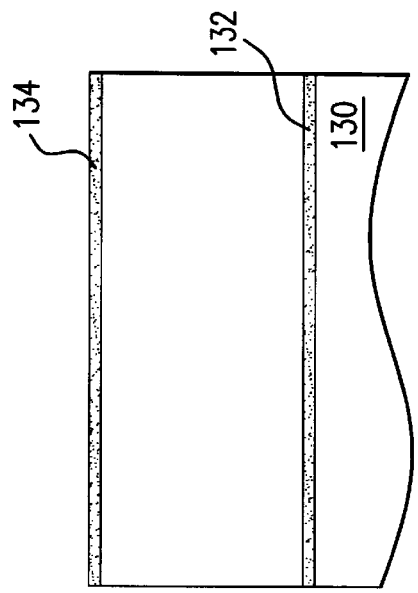
FIGS. 27–34 illustrate a different process flow for forming the structures illustrated in FIGS. 9 and 13 using a substrate having a buried barrier structure such as a buried oxide layer in a silicon on insulator (SOI) structure.
Figure 28A:
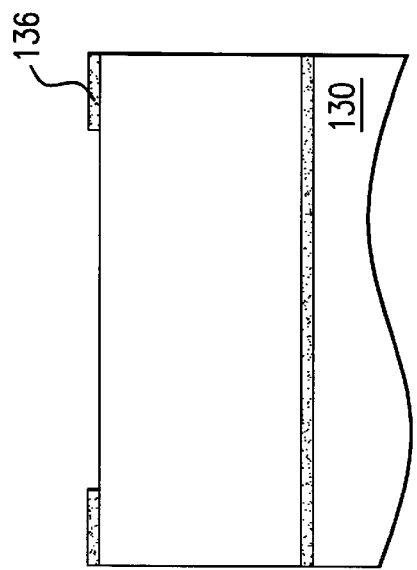
Figure 27B:
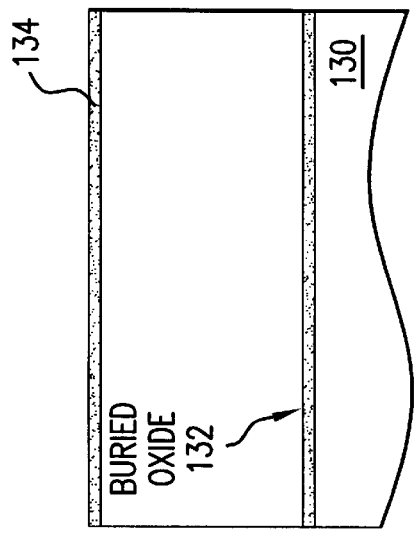
Figure 28B:
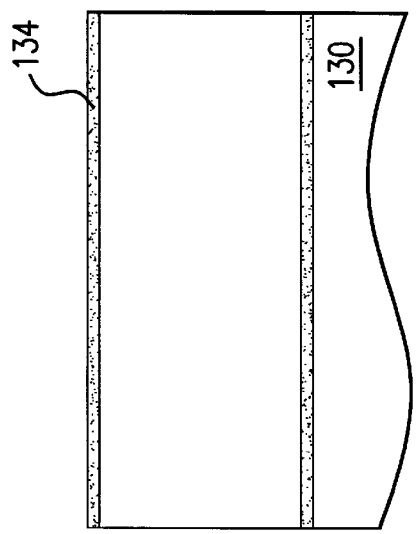

The substrate 130 having a buried oxide layer 132 is covered by deposition of the material 134 that will be formed into the first etching mask, shown in FIG. 27. Most preferably layer 134 is deposited to a thickness sufficient to protect the silicon substrate through an extended deep etching process used to define the height of components including beams and the height of alignment channel. For example, layer 134 may be oxide deposited to a thickness of approximately one micron by chemical vapor deposition (FIG. 27) to withstand a deep etch into a silicon substrate to a depth of 75 microns or more. Layer 134 is patterned using conventional photolithography to form etch mask 136 over the alignment channel sections of the optical component, as shown in FIG. 28(b). The etch mask 136 over the component substrate is not initially etched. In the alignment channel substrate, the mask 136 has an opening sized to define the width of the upper recess for the alignment channel.

Figure 29A:
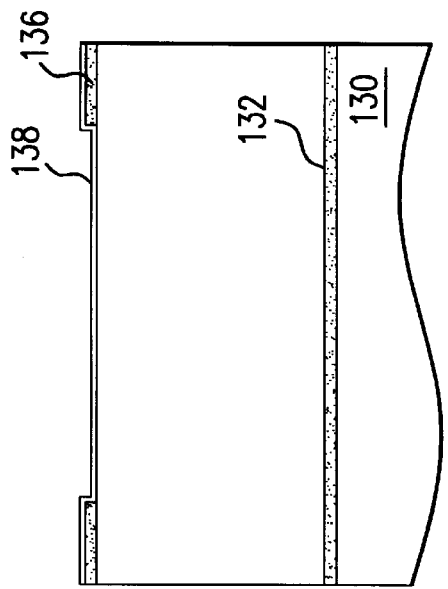
Figure 30A:
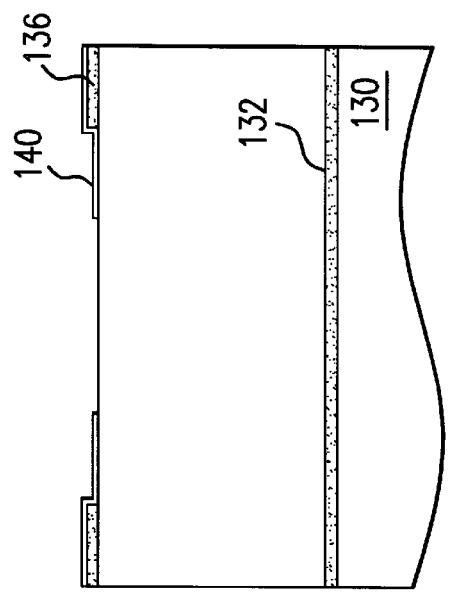
Figure 29B:
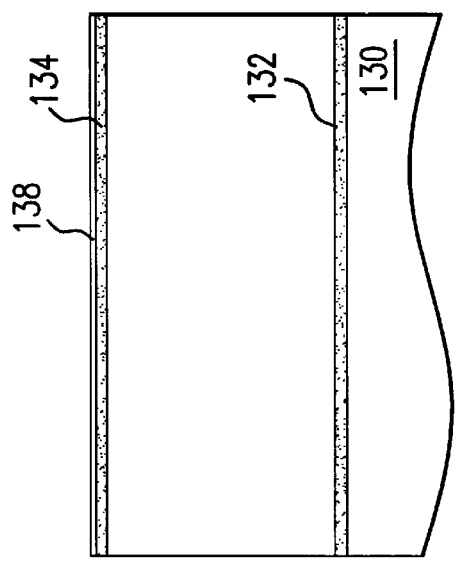
Figure 30B:
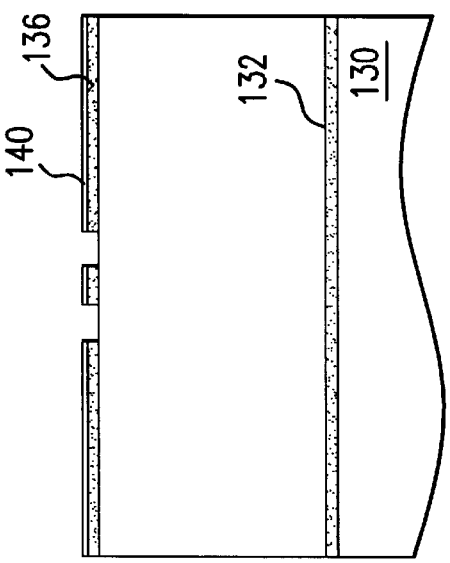

A second layer 138 of masking material, for example another layer of silicon oxide, is then deposited to a comparatively thin thickness of 0.2 micron (FIG. 29). Conventional lithography patterns layer 138 in the alignment channel region of the substrate (FIG. 30(a)) to define the deep etch mask 140 with openings corresponding to the trench width. Lithography also patterns the layer 138 to define etch mask 140 of the alignment channel substrate, providing an opening that defines the width of the lower recess of the alignment channel (FIG. 31(b)). Here again, oxide is selected for the first and second masking layers because it is particularly compatible with the deep anisotropic etching process preferably used in manufacturing the optical switch. Photoresist might also be used for these deep etching masks.

Figure 31B:
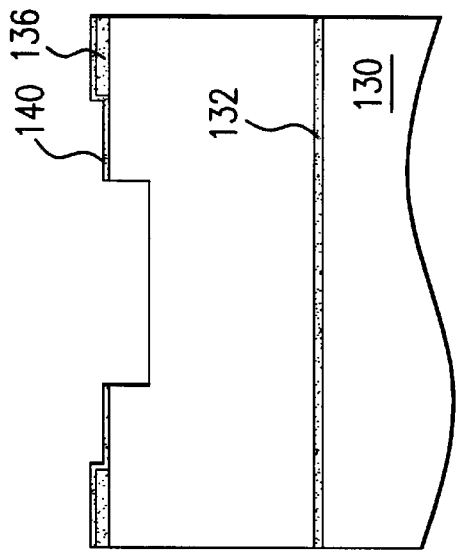
Figure 32B:
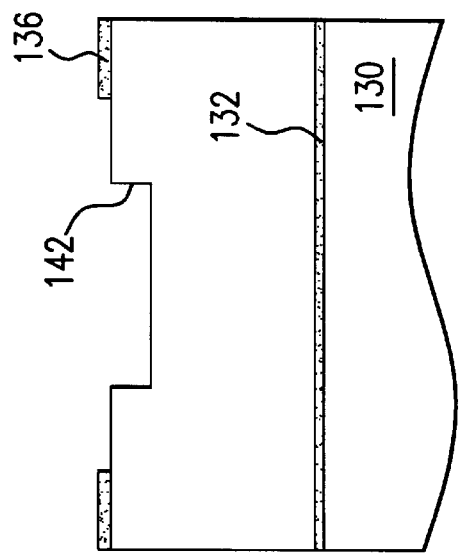
Figure 31A:
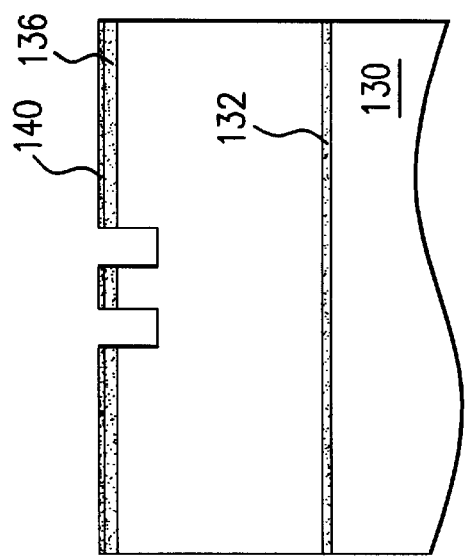
Figure 32A:
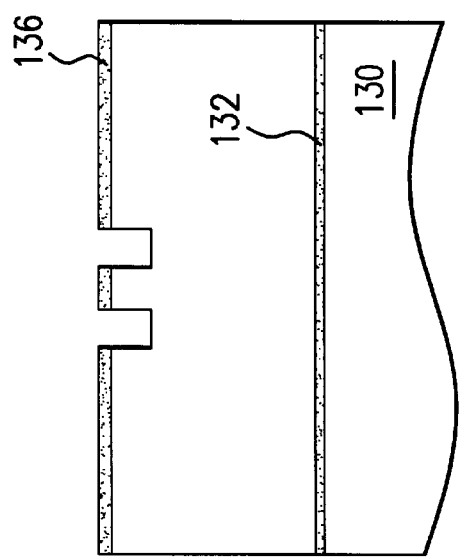

Deep anisotropic etching through the opening in the channel etching mask 140 removes the exposed surface of the substrate 130 to a depth desired for the lower recess of the stepped alignment channel structure, as shown in FIG. 31(b). In the illustrated embodiment the depth of the first etch is shown as 20 microns, which generally corresponds to the lower recess depth discussed above. This etching is preferably an anisotropic, reactive ion etching process using the Bosch process, discussed above. During this process, etching begins in the trenches adjacent the beams and other optical component structures in the component substrate, as shown in FIG. 31(a). After the lower recess 142 is etched to a preferred depth, the second etch mask 140, for example, by an anisotropic etch back process, stopping in part on the surface of substrate 130 exposed by the first etch mask 136, as shown in FIG. 32. FIG. 32 shows that sidewall regions are formed along the edges of the first mask 136 over the alignment channel substrate during the anisotropic etch back process. Preferably, the width of these sidewall regions is accommodated in selecting the width of the openings in the first mask 136.

Figure 33A:
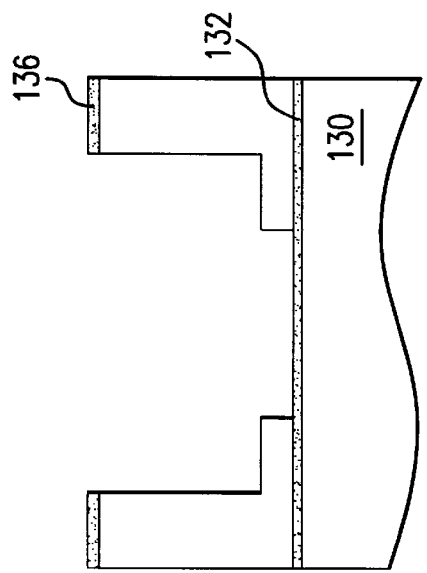
Figure 34A:
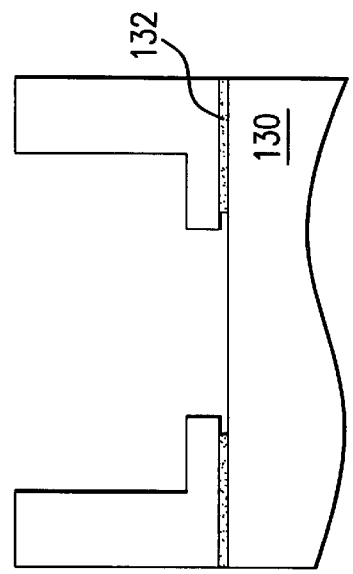
Figure 33B:
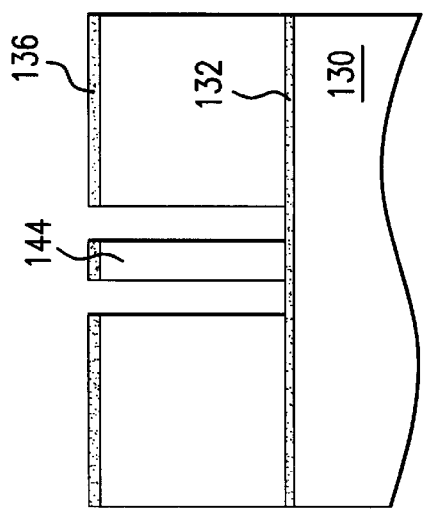
Figure 34B:
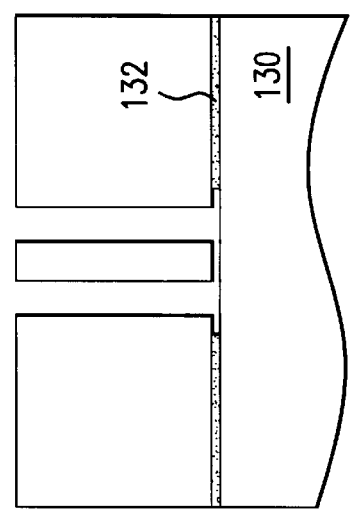

The preferred deep etching process etches the substrate 130 where exposed by the first mask 136, as shown in FIG. 33, with the second etch continuing to and stopping on the buried oxide layer 132. As illustrated in FIG. 33, this depth might be on the order of 75 microns. The depth achieved in this etch is also approximately equal to the height of the beams 144 and other component structures (FIG. 33(a)).

The next sequence of processing steps achieves release of the beam 144 and other component structures from the silicon substrate 130 so that such structures are capable of moving with substantial independence of the substrate 130. The release processing in this embodiment is selective oxide etching to remove portions of the buried oxide layer 132. For example, etching in a hydrofluoric (HF) acid solution selectively removes a sufficient amount of the buried oxide layer to release the beam 144. This release etch also strips the first etch mask 136.

Most preferably the silicon on insulator substrate has a highly conductive surface layer, e.g., doped to have a conductivity of 0.1 Ω/cm or less and more preferably to have a conductivity of 0.01 Ω/cm or less. This makes the electrodes sufficiently conductive without further processing like that illustrated in FIG. 26. On the other hand, it remains desirable to deposit a layer of metal over the resulting structure to render the shutter opaque.

Although the present invention has been described in detail with reference only to the presently preferred embodiments, those of ordinary skill in the art will appreciate that various modifications can be made without departing from the invention. Accordingly, the invention is is not to be limited to any of the described embodiments thereof but is instead defined by the following claims.

What is claimed:

1. An optical system, comprising:
   an optical component formed on a substrate; and
   an alignment channel formed on the substrate, the alignment channel adapted to accept an optical fiber and couple the optical fiber to the optical component, the alignment channel including first and second edges extending along a length of an optical fiber positioned within the alignment channel and positioned within the alignment channel so that an optical fiber positioned within the alignment channel is supported and positioned by the first and second edges.

2. The optical system of claim 1, comprising first and second alignment channels coupling first and second fibers to the optical component.

3. The optical system of claim 1, wherein the alignment channel comprises an upper recess and a lower recess, the first and second edges defined at the intersections of the upper recess and the lower recess.

4. The optical system of claim 3, wherein the upper recess has a generally rectangular cross section with a portion missing from a bottom of the upper recess, and the lower recess has a generally rectangular cross section.

5. The optical system of claim 4, wherein the substrate is single crystal silicon and the optical component is formed on a surface of the single crystal silicon having (111) orientation.

6. The optical system of claim 4, wherein the substrate is a silicon-on-insulator wafer with a buried oxide layer.

7. An optical system, comprising:
   a substrate having an optical path defined therein, the substrate further comprising a shutter translatable with respect to the optical path, the shutter within the optical path in at least one position and the shutter not in the optical path in at least one position, the shutter translatable in response to electrical signals,
   the substrate further comprising first and second alignment channels, the first alignment channel adapted to accept a first optical fiber and position a first core of the first optical fiber with respect to the second alignment channel, the second alignment channel adapted to accept a second optical fiber and position a second core of the second optical fiber with respect to the first alignment channel,
   the optical path passing through the first and second alignment channels, a portion of the optical path extending outside of the first and second alignment channels with the shutter selectively positioned within the portion of the optical path outside of the first and second alignment channels, and
   the first and second alignment channels are offset with respect to one another so that the first core and the second cores are misaligned when the first and second fibers are positioned within the alignment channels.

8. The optical system of claim 7, wherein the substrate is single crystal silicon and the optical component is formed on a surface of the single crystal silicon having (111) orientation.

9. The optical system of claim 7, wherein the substrate is a silicon-on-insulator wafer with a buried oxide layer.

10. The optical system of claim 7, further comprising first and second optical fibers in the first and second alignment channels, faces of the first and second fibers angled from perpendicular to the optical path by a sufficient angle to prevent back reflections from a surface of the shutter.

11. The optical system of claim 10, wherein each alignment channel includes first and second edges extending along a length of an optical fiber positioned within the alignment channel, the first and second edges positioned within the alignment channel so that an optical fiber positioned within the alignment channel is supported and positioned by the first and second edges.

12. The optical system of claim 10, wherein a separation between the faces of the first and second fibers is selected to efficiently couple light between the fibers when the shutter is in an open state.

13. The optical system of claim 10, wherein each of the alignment channels comprises an upper recess and a lower recess, the first and second edges defined at the intersections of the upper recess and the lower recess.

14. The optical system of claim 13, wherein the upper recess has a generally rectangular cross section with a portion missing from a bottom of the upper recess, and the lower recess has a generally rectangular cross section.

15. The optical system of claim 7, wherein the optical path is defined in part by first and second optical fibers, a portion of the optical path extending outside of the first and second optical fibers with the shutter selectively positioned within the portion of the optical path outside of the first and second optical fibers, the shutter coated with metal to block the optical path.

16. The optical system of claim 15, wherein the portion comprises free space between the first and second fibers.

17. The optical system of claim 7, further comprising a latch adapted to couple to a portion of the shutter and hold the shutter out of the optical path.

18. The optical system of claim 7, further comprising a latch adapted to fit around a portion of the shutter and hold the shutter out of the optical path solely mechanically.

19. An optical system, comprising:
   an optical path defined in part by first and second optical fibers, a portion of the optical path extending outside of the first and second optical fibers;
   a substrate having the optical path defined at least partially therein, the substrate further comprising a shutter selectively translatable with respect to the optical path, the shutter within the optical path in at least one position and the shutter not in the optical path in at least one position, the shutter selectively translatable in response to electrical signals within the portion of the optical path outside of the first and second optical fibers; and a latch formed in the substrate and adapted to couple to a portion of the shutter and hold the shutter out of the portion of the optical path outside of the first and second optical fibers.

20. The optical system of claim 19, wherein the portion comprises free space between the first and second fibers.

21. The optical system of claim 19, wherein the substrate is single crystal silicon and the optical component is formed on a surface of the single crystal silicon having (111) orientation.

22. The optical system of claim 19, wherein the substrate is a silicon-on-insulator wafer with a buried oxide layer.

23. The optical system of claim 19, wherein the optical path is defined in part by first and second alignment channels.

24. The optical system of claim 23, wherein the alignment channels are adapted to accept an optical fiber and couple the optical fiber to the shutter, each of the alignment channels including first and second edges extending along a length of the optical fiber positioned within the alignment channel so that the optical fiber positioned within the alignment channel is supported and positioned by the first and second edges.

25. The optical system of claim 24, wherein each of the alignment channels comprises an upper recess and a lower recess, the first and second edges defined at the intersections of the upper recess and the lower recess.

26. The optical system of claim 19, wherein faces of the first and second fibers are angled from perpendicular to the optical path by a sufficient angle to prevent back reflections from a surface of the shutter.

27. The optical system of claim 19, wherein a separation between the faces of the first and second fibers is selected to efficiently couple light between the fibers when the shutter is in an open state.

28. The optical system of claim 26, wherein a separation between the faces of the first and second fibers is selected to efficiently couple light between the fibers when the shutter is in an open state.

29. The optical system of claim 28, wherein the first and second fibers are offset with respect to each other so that cores of the first and second fiber are misaligned with respect to each other.

30. An optical system, comprising:

a substrate having an optical path defined therein, the substrate further comprising a shutter translatable with respect to the optical path, the shutter within the optical path in a first position and the shutter not in the optical path in at least a second position, the shutter translatable in response to electrical signals, the shutter having a reflecting surface positioned within the optical path when the shutter is in the first position, the substrate further comprising first and second alignment channels, the first alignment channel holding a first optical fiber and positioning a first core of the first optical fiber with respect to the second alignment channel, the second alignment channel holding a second optical fiber and positioning a second core of the second optical fiber with respect to the first alignment channel, the optical path passing through the first and second fibers, a portion of the optical path extending outside of the first and second fibers with the shutter selectively positioned within the portion of the optical path outside of the first and second fibers, and faces of the first and second fibers each having an angle with respect to the optical path sufficient to prevent back reflections from the shutter when the shutter is in the first position.

31. The optical system of claim 30, wherein a separation between the faces of the first and second fibers is selected to efficiently couple light between the fibers when the shutter is in an open state.

32. The optical system of claim 30, wherein the first and second fibers are offset with respect to each other so that cores of the first and second fiber are misaligned with respect to each other.

* * * * *